United States Patent [19]

Hazelton

[11] 4,130,883

[45] Dec. 19, 1978

[54] DATA COMMUNICATION SYSTEM HAVING BIDIRECTIONAL STATION INTERFACES

[75] Inventor: Dean W. Hazelton, Bethlehem, Pa.

[73] Assignee: Bethlehem Steel Corporation, Bethlehem, Pa.

[21] Appl. No.: 621,973

[22] Filed: Oct. 14, 1975

[51] Int. Cl.² .......................... G06F 3/04; G06F 5/04
[52] U.S. Cl. ................................................... 364/900
[58] Field of Search ...................... 340/172.5, 347 DD; 235/151.1; 72/8, 10; 364/200 MS File, 900 MS File, 120

[56] References Cited

U.S. PATENT DOCUMENTS

| | | | |
|---|---|---|---|
| 3,264,397 | 8/1962 | Glickman et al. | 340/172.5 |
| 3,345,619 | 10/1967 | Anderson et al. | 340/172.5 |
| 3,439,347 | 4/1969 | Goshorn et al. | 340/172.5 |
| 3,512,136 | 5/1970 | Harmon et al. | 340/172.5 |
| 3,541,513 | 11/1970 | Paterson | 340/172.5 X |
| 3,592,031 | 7/1971 | Sutton et al. | 72/8 |
| 3,611,311 | 10/1971 | Andrews | 340/172.5 |
| 3,633,169 | 1/1972 | Bickford | 340/172.5 |
| 3,714,635 | 1/1973 | Hamilton et al. | 340/172.5 |
| 3,801,962 | 4/1974 | Moore et al. | 340/172.5 |
| 3,975,712 | 8/1976 | Hepworth et al. | 364/200 |

OTHER PUBLICATIONS

Andreiev, N.; "The Search For the Standard Control Signal Bus" in Control Engineering, Mar. 1975; pp. 43-46.

Primary Examiner—Melvin B. Chapnick
Attorney, Agent, or Firm—Joseph J. O'Keefe; John I. Iverson; George G. Dower

[57] ABSTRACT

Digital data, in the form of serial station bit frames which exclude protocol information, are communicated bidirectionally over a plurality of serial transmission channels to peripheral devices in a digital process control system. Data enters and leaves a process control computer input-output section serially in response to software-generated control signals. Serial-to-parallel station interfaces are located along each channel. Each interface has a multifunctional shift register responding to the control signals to provide not only bidirectional data flow through each station, but simultaneous parallel loading of each peripheral device. One software control logic arrangement eliminates modems and portions of hardwired data flow control logic elements in each station interface, yet operates with a station bit frame which excludes protocol information. Also provided are true interrupt capability at each interface; verification of every bit of input and/or output of each station interface; diagnostics.

20 Claims, 13 Drawing Figures

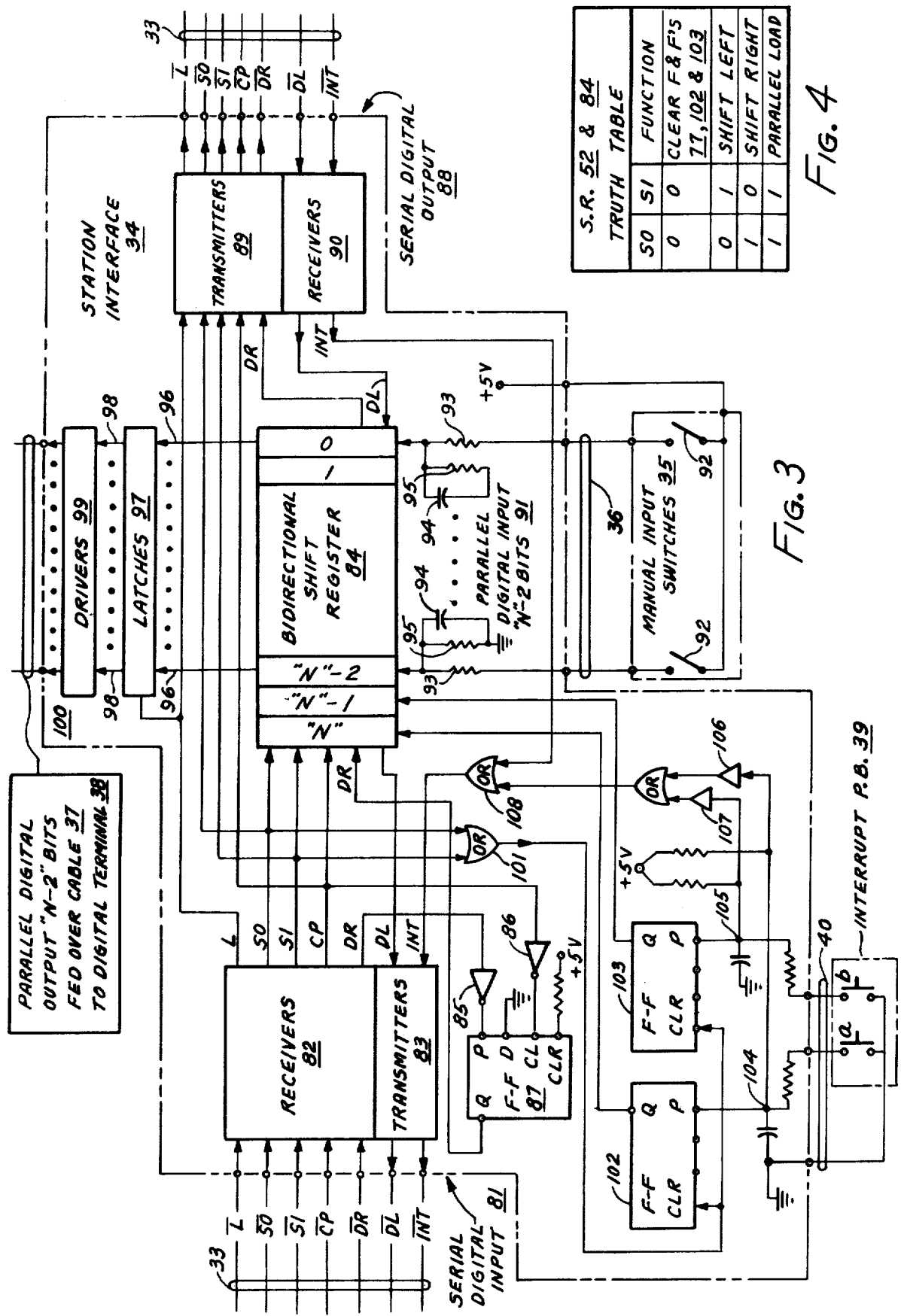

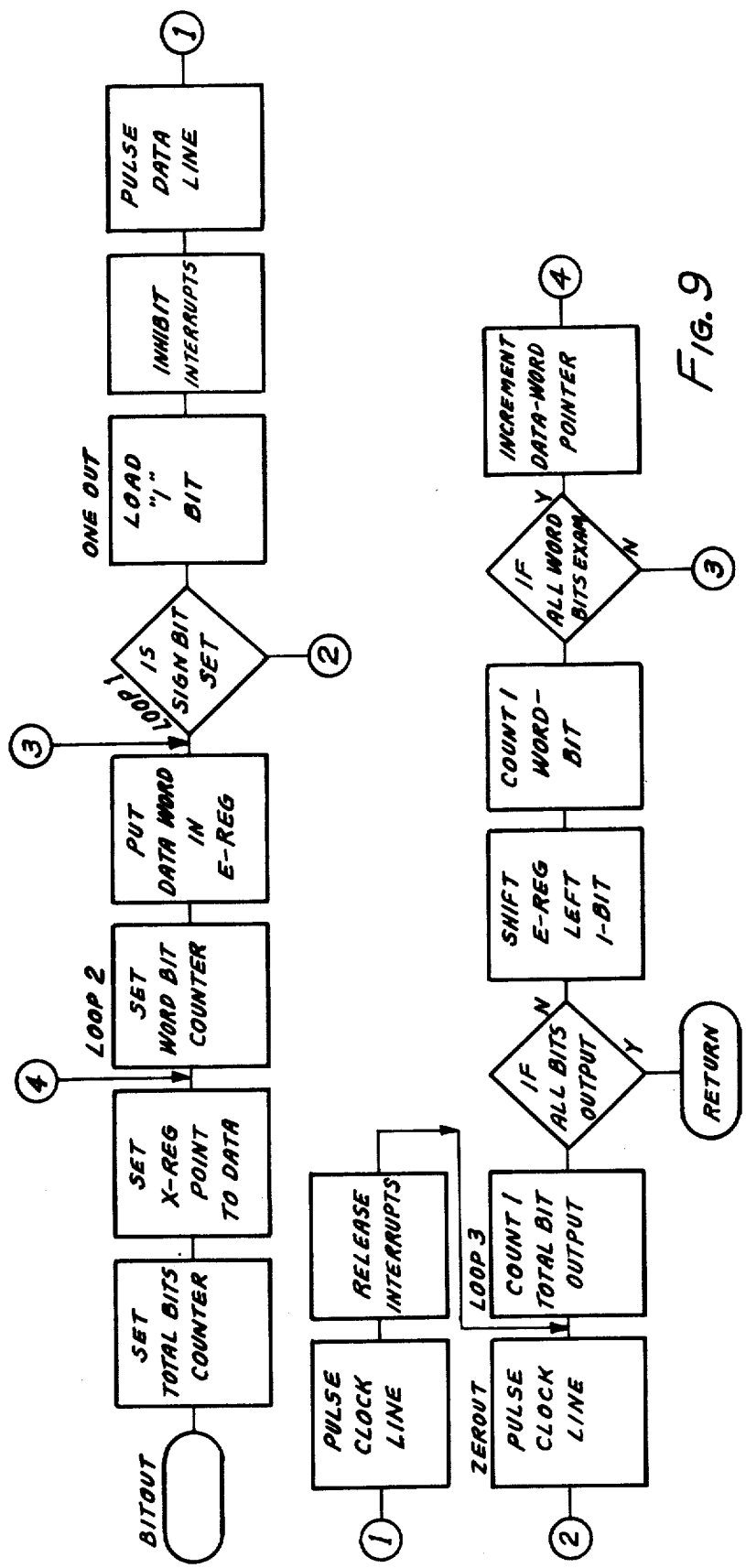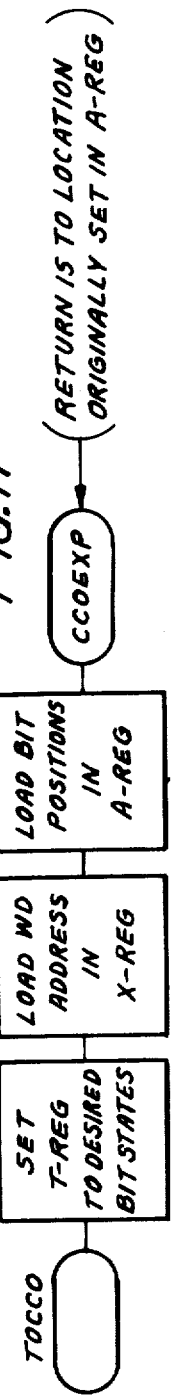

DATA COMMUNICATION SYSTEM HAVING BIDIRECTIONAL STATION INTERFACES

BACKGROUND OF THE INVENTION

1. Field of the Invention

This invention relates generally to digital data communications systems. More particularly, this invention relates to a system for bidirectional communication of serial-bit-frame data without protocol information from a serial-access digital control computer, over serial data transmission channels, through control computer software-controlled series-to-parallel station interfaces each having a single multifunctional shift register, and then to peripheral devices.

This invention is particularly useful in digital process control systems, for example, to communicate data accurately in the severe physical and noisy electrical environments of an automated steel rolling mill as disclosed below.

2. Description of the Prior Art

Recent increases in demands for more production and higher quality products from the steel industry have prompted changes in mill installations. For example, in automated steel rolling mills, mill speed has been increased and control emphasis has shifted from simple local analog control systems to complex digital process control systems to produce closer and more accurate mill control. In the latter type of system, a programmed digital control computer is the central system component and it is involved in data communications to peripheral devices over lines hundreds and sometimes thousands of feet long. Peripheral devices include: parameter sensors and actuators on the rolling mill, presets, controllers, displays, recording terminals, programmers' desk and a remote scheduling desk.

A high degree of accuracy and reliability of data communications to and from the computer is necessary to maintain the desired high degree of rolling mill control. This is a must despite the fact that data traverses great distances and data communications, as well as other system components, are subjected to the severe physical and noisy electrical environment prevailing in steel rolling mills.

One prior art approach to the data communication problems was to convert each analog sensor and actuator signal to corresponding binary digital signals at the rolling mill site and transmit the digital signals to and from a control computer having a comprehensive parallel-access input-output section and a memory section organized for parallel storage and comparison purposes. Individual multiconductor cables extended parallel data communications from the computer to each peripheral device named above. This resulted in a proliferation of data cables which proved rather costly from procurement, installation and maintenance viewpoints. The first two costs have been known to approximate forty percent of the initial mill automation costs. In addition, add-on capability of this system was also expensive and sometimes unattainable in the computer without significant modifications to its input-output section.

Another approach to the data communications problems was to use a commercially available serial-access control computer and serial looping data communication cables interconnecting the computer with peripheral devices by way of serial station interfaces. Two general types of serial data communications equipment are available and are described as follows.

The first type of serial communication equipment includes a high frequency coaxial cable used for data communications to and from interface devices. Each interface has an R.F. carrier modem and complex hardwired logic elements for decoding protocol information, such as station code number, synch. bit, demand access, polling and others, in addition to decoding control data information. This equipment while suitable for some installations generally will not operate reliably in steel mill environments because of analog problems of adjustment and tuning. In addition, it is slow, expensive, complex and difficult to maintain.

The second type of serial data communications equipments is adapted for point scanning and includes a multiconductor cable having up to 96 lines for transmitting both data and protocol information in parallel to and from interface devices. Each interface eliminates modems, but has very complex hardwired logic elements for decoding protocol as well as control data information. This equipment is also slow, expensive, complex and difficult to maintain.

SUMMARY OF THE INVENTION

One of the objects of this invention is to provide an improved data communications system for use in a digital process control system.

Another object of this invention is to provide a digital data communications system having a simplified design and fully digital, yet will be accurate and reliable and affect cost savings.

Another object of this invention is to provide a digital data communications system which does not require protocol information to be decoded at a station interface.

A further object of this invention is to provide a digital data communications system having true interrupt, input-output verification, and improved diagnostic capabilities at each station interface.

Still another object of this invention is to provide a digital data communications system that will be easy to maintain, at least in part, by personnel of average skill.

The foregoing objects are attainable in a digital process control system, for example, by arranging a digital data communications system to handle data in the form of serial-station bit-frames which exclude protocol information, and by communicating data in this form alternately bidirectionally over a plurality of serial transmission channels from a digital control computer to parallel-entry peripheral devices. The computer's input-output section is arranged for serial access through time-division multiplexing, but existing parallel access computers may be converted as described below. Each serial data transmission channel consists of only seven or eight parallel lines carrying data, control and interrupt signals to and from the computer and one or more serial-to-parallel station interfaces in a string, thereby coupling one or more peripheral devices to the computer simultaneously. Each station interface includes a multifunctional shift register through which serial data signals pass alternately bidirectionally, and through which a digital preset device is coupled to the peripheral device, all in response to software-generated control signals. Key features of the data transmission system are as follows:

A. Multifunctional shift registers are used in station interfaces which enable the entire system to be used for both input and output operations. This system is simple and fully digital; there are no analog type adjustments present as are in modems.

B. Individual station interfaces may be series-connected to make a data transmission channel any desired length, thereby permitting interfaces to be located in different areas. A plurality of data transmission channels may be utilized to satisfy process control and display needs.

C. Separate data, control and interrupt lines are bundled in a bus which enters and leaves the control computer input-output section for each data transmission channel.

D. Due to the simplified data frame arrangement, there is no need to transmit a control block in the data frame and use the associated time-consuming, handshaking equipment in each station interface. All control logic is implemented in computer software rather than in interface hardware. Station interface is identified by its relative position in the computer storage field. Thus, increased computer flexibility and improved station interface diagnostics are possible compared to other forms of hardware-only time-division multiplexed systems.

E. Because of the simplified interface design, any typical computer-driven input-output system can operate a data transmission channel. There is no need to procure, operate and maintain "front end" equipment.

F. A true interrupt capability is present. Therefore, the process control computer is not required to endlessly scan input digital signals looking for a change. A key event, such as depressing an INTERRUPT button, will force the computer to go active within microseconds after the receipt of the interrupt.

G. The data transmission system operates asynchronously. Therefore, the system is not critical with respect to computer data processing unit timing; hence the system may be used with any process control computer. A high priority task can interrupt data transmission on any channel without losing data.

H. Every input as well as output transmission is verified. Output data is read back into the computer where a complete image match against the desired transmitted image is generated. If a mismatch is found, the transmission cycle is repeated. Thus, the traditional time-domain multiplexing problem of noise invasion is controlled. This verification feature cannot be done with conventional parallel-access output equipment without purchasing, operating and maintaining additional input equipment.

I. The only factors limiting the speed of data transmission are the speed at which the computer's input-output section operates, and the speed of execution of the programmed control algorithm. The data transmission channels operate at machine speeds, thereby avoiding the use of programmed delays and task dismissals. Hence, the computer's data processing unit may be used more efficiently.

J. Two types of high-density station interface designs are provided. Both permit a minimum of field wiring; have high output capacity for driving loads and minimizing noise invasion; and both have input verification features. One type of station interface also verifies output; has one data bit frame size capacity; and recognizes and remembers one interrupt. The other type station interface has a larger data bit frame size capacity than the first type; and recognizes and remembers two interrupts.

BRIEF DESCRIPTION OF THE DRAWINGS

FIG. 3 is a schematic diagram of a second station interface used in the invention shown in FIG. 1.

FIG. 4 is a truth table for a multifunctional shift register used in the station interfaces shown in FIGS. 2 and 3.

FIGS. 8 and 9 are flow charts of control computer software subroutines used with the shift register driver subroutine and referred to as BITIN and BITOUT respectively.

FIG. 11 is a flow chart of a control computer software subroutine used with the shift register driver subroutine and referred to as TOCCO.

DESCRIPTION OF THE PREFERRED EMBODIMENT

Figure 1:
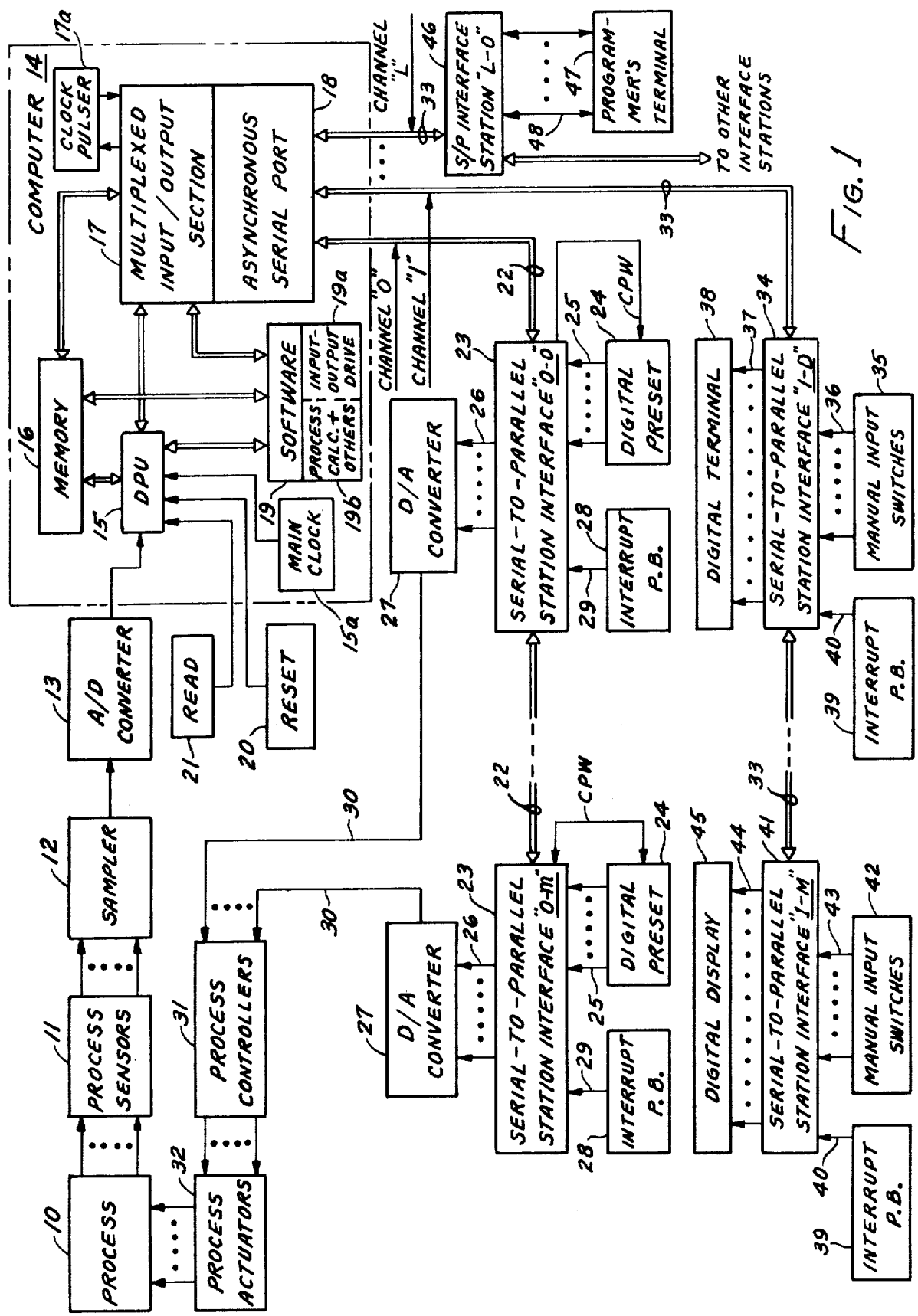
FIG. 1 is a block diagram of a digital process control system, for example, an automated steel rolling mill process, which incorporates the digital data communication system of the present invention.

Referring to FIG. 1, the digital data communications system of this invention is exemplified in the environment of an automated steel rolling mill, the mill being shown as process 10. Briefly, a serial-access process control computer receives process sensor signals, setpoint information and man-machine data, and performs programmed calculations under manual and automatic modes of operations. Serial data is transferred to and from the computer and serial-to-parallel station interfaces over transmission channels having parallel data and control lines. Several different parameters use essentially the same output lines from the computer, thereby realizing a savings in both termination and rack space and in the amount of digital input and output required. Hence, this digital data communication system includes the provisions of substantial and economical expansion of a computer's digital input-output capability, as well as novel interface station design.

Rolling mill process 10 includes a plurality of successive rolling mill stands, each operating at a different roll gap and roll speed to reduce a workpiece (not shown) to an accurate, predetermined exit thickness. These and other process parameters are sensed by a corresponding plurality of process sensors 11 which produce a plurality of analog signal sources representing roll gaps, roll speeds, exit thickness and the other parameters. Each of the plurality of signal sources is scanned sequentially by sampler 12, then conducted to A/D converter 13. Here the process analog signals are converted to process digital bit signals and are fed to control computer 14.

control computer 14 is a conventional digital process control computer having major components comprising: data processing unit 15 operating in response to main clock 15a, a memory 16, a multiplexed input-output section 17 operating in response to clock pulser 17a, and asymmetrical serial port 18 which is associated with input-ouput section 17. Major components 15, 16, 17, 17a and 18 operate unitarily under control of software 19; also in response to reset button 20 and read button 21 when acting on data processing unit 15 in their usual manner. For purpose of illustration only, it will be considered that software 19 consists essentially of two parts, namely, input-ouput drive software 19a and process calculation and other software 19b.

It is to be noted that the timing of serial digital data appearing at serial port 18 is asymmetrical with respect to the timing of master clock 15a which is used for process calculation and other purposes. This is because clock pulser 17a, which acts only on input-ouput section 17 in response to software 19a, has its own, slower, time base and is independent of master clock 15a. Likewise, if timeskewing of clock pulses from clock pulser 17a should become objectionable, such as may occur on long strings of interface stations on any one data transmission channel, then the output section of clock pulser 17a should include a conventional high-current and high-speed driver. In this manner, clock pulses may be fed in parallel to station interfaces. Otherwise, serial transmission of the clock pulses may be employed. Reference will be made hereinafter to both parallel and series feed of clock pulses to station interfaces, but no distinction is to be made for either type feed.

Control computer 14 may be a general-purpose, mini or micro-programmed digital computer available commercially from numerous sources. One such computer is Xerox Corporation's Model 530 general-purpose computer having their Model 7930/7931 digital input-ouput system, the latter corresponding to major components 17 and 18 shown in FIG. 1. This computer has a parallel access input-output section which is expanded by converting it to serial access so that data enters and leaves computer 14 in serial form. Conversion is accomplished through time-division multiplexing; and by reorganizing the data storage and comparison fields of that portion of the Model 530 computer which corresponds to memory 16 shown in FIG. 1.

The process digital bit signals fed from A/D converter 13 to data processing unit 15 are assimilated sequentially in control computer 14 according to a predetermined process control program established by, and included in, software 19b. Further reference to the process control software 19b will not be made because it is not part of the present invention. Nonetheless, each resulting signal associated with a given process parameter is fed to serial port 18 as digital data signals DR (data right, or data output) in the form of serial station bit frames, each frame having "N" bits per frame and being without protocol information. Digital preset and other digital data signals are fed into serial port 18 as digital data signals DL (data left, or data input), also in the form of serial station bit frames, each having "N" bits per frame and being without protocol information. Input-output drive software 19a directs the use of the digital data signals DL and DR in computer 14 as well as into and out of serial port 18.

Figure 6:
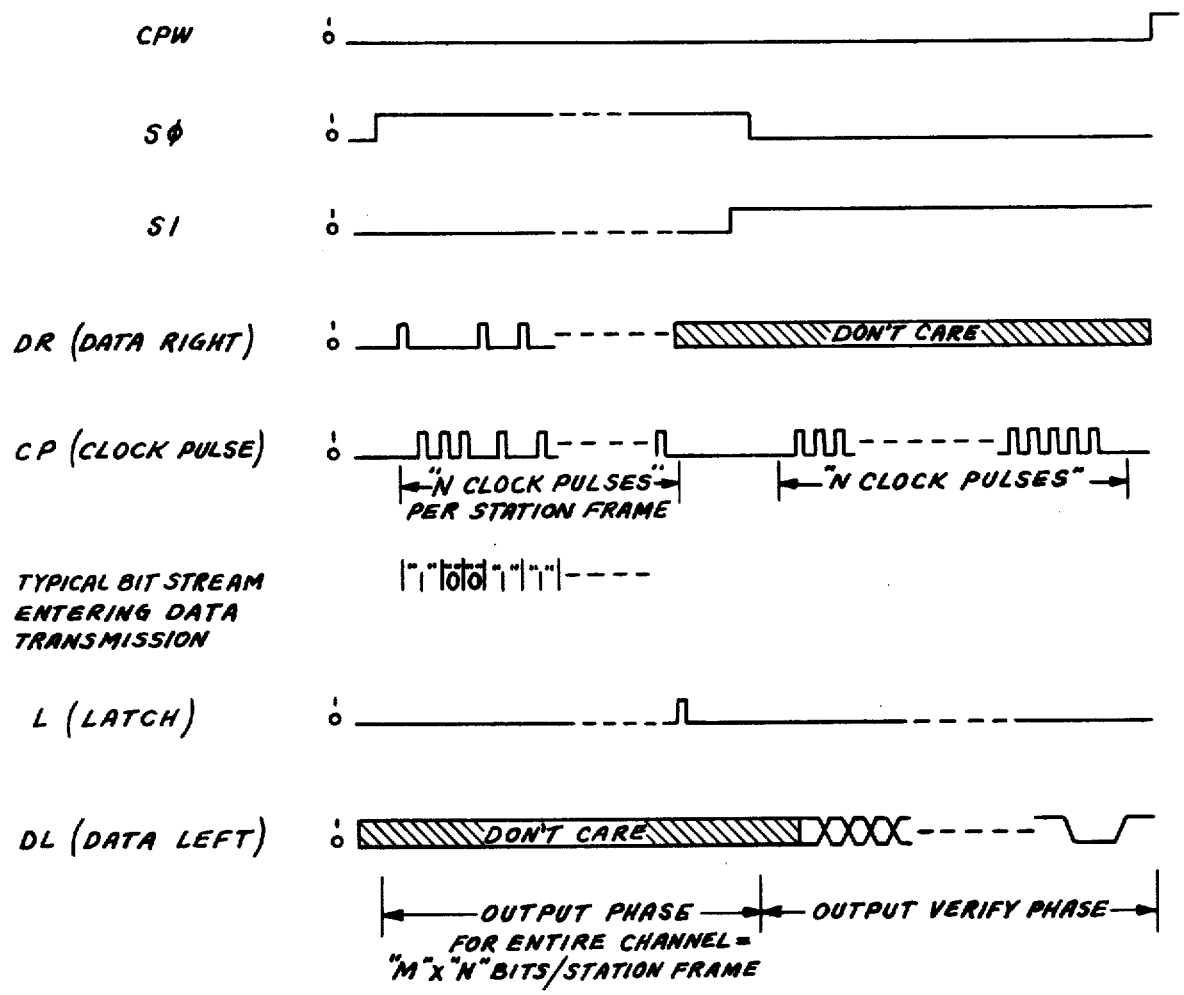
FIG. 6 is a timing diagram for a basic output cycle of various digital data and control signals emanating from a control computer used in the invention, and includes an output phase and an output verify phase of the basic cycle.
Figure 5:
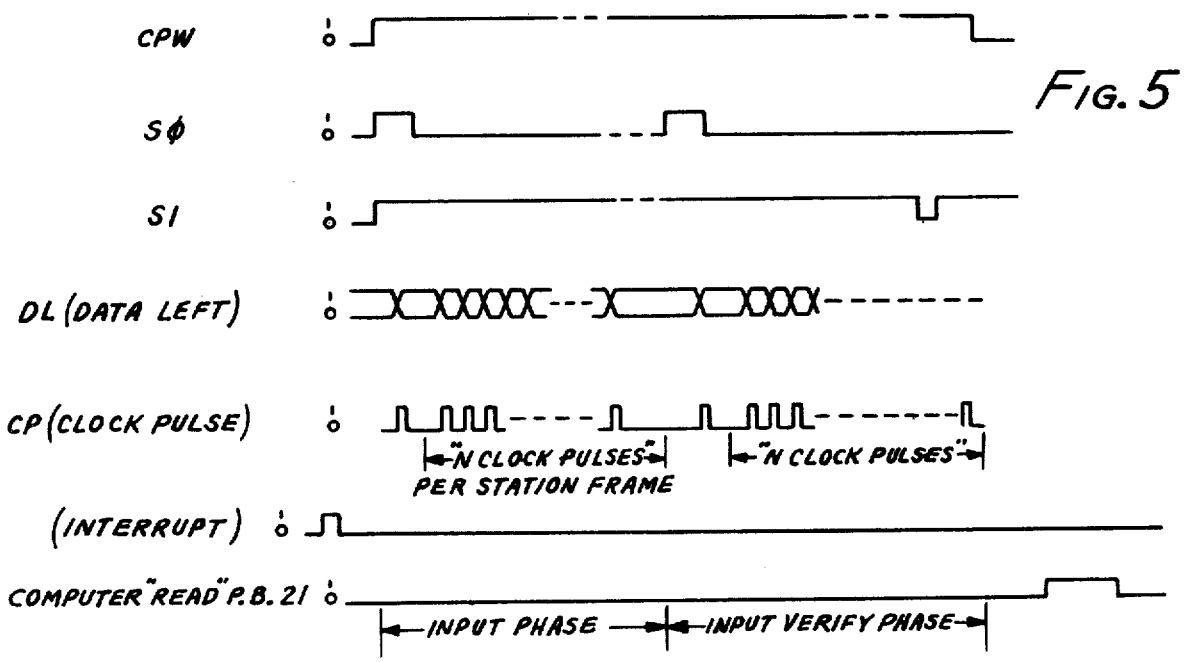
FIG. 5 is a timing diagram for a basic input cycle of various digital data, control and interrupt signals entering a control computer used in this invention, and includes an input phase and an input verify phase of the basic cycle.

Input-output drive software 19a, or simply drive software 19a, also causes computer 14 to generate five control signals. This is done by using conventional hardware normally included in the computer. These control signals, together with an interrupt signal, are then fed to and from serial port 18 and station interfaces along several data transmission channels "0", "1" ... "L" described below. Waveforms of the five control signals and the interrupt signal are shown in FIGS. 5 and 6 timing diagrams, which diagrams also include a typical station data bit frame having only "N" bits per frame. Flow charts representing drive software 19a for causing computer 14 to generate the five control signals are shown in FIGS. 7 to 11. The interrupt signal may be man-initiated.

The first and second control signals initiated by drive software 19a are S0 and S1. These are flip-flop driven signals in computer 14 which control the flow of DR and DL serial frames of digital data signals into and out of shift registers in all station interfaces on a given channel. In addition they control other functions shown in the FIG. 4 truth table.

The third such control signal is CP, the clock pulses produced by clock pulser 17a. When the CP pulse is present, depending upon the state of the S0 and S1 pulses, a shift register in all station interfaces will respond by shifting right one position, or shifting left one position, or strobing data into the shift register. This latter condition is on effect a parallel loading of the entire data transmission channel with digital data to be read from the rolling mill in process 10.

The fourth such control signal is L, a buffer latch pulse which when present will simultaneously cause data present at the parallel outputs of each shift register in one or more station interfaces in each channel to be transferred to latch or storge devices in each station interface.

The fifth control signal initiated by drive software 19a is CPW, a complementary signal associated with the L signal, which when present permits parallel output of all station interfaces on a channel to their respective destinations. The CPW signal is also involved in verifying both parallel input and output signals at each station interface on the channel.

In addition to causing the generation of the above five control signals, drive software 19a is adapted to receive and process the external interrupt signal. This signal is identified as INT and operates in response to any one or more contact closures in any station interface to alert computer 14 as to when an interface station should be read. This precludes endless scanning to detect a change in digital status of any station interface associated with any digital function.

It is believed a restatement is in order here of of the digital data signals DR and DL. These signals are in the form of serial station bit frames, each station having zero to "N" bits per frame reading right to left in FIGS. 2, 3, 4 and 6. Each station bit frame includes zero to "N-1", or "N-2" actual data bits per frame, depending on whether a station bit frame consists of, for example, 16-bits, or 64-bits per frame. The remaining "Nth" bit, or "Nth" and "N-1" bits, respectively, are designated INT (interrupt) bits for cueing computer 14 as to which interface station requested the interrupt. The actual station is identified by its relative storage position in memory 16. The DR signal data bit stream travels to the right in a FIG. 2 or 3 station interface, or is outputted at serial port 18 shown in FIG. 1. A DR pulse present with CP signal present causes a "1" to be shifted into a shift register in the next interface station in a string, whereas no DR pulses present causes a "0" to be shifted in the same direction upon the subsequent appearance of the CP signal. The DR signal carries a level signal which indicates the state of the first bit position on the shift register of one station interface, that is bit zero, for all data frame transmissions to subsequent station interfaces. The DL signal data-bit-stream is the same as the DR signal except it travels to the left in a FIG. 2 or 3 station interface, or is inputted to serial port 18 shown in FIG. 1. The DL signal carries a level signal which indicates the state of the last bit position on the shift register on one station interface, that is bit "N", for all data frame transmissions from station interfaces into computer 14.

Still referring to FIG. 1, as mentioned above, serial digital data signals enter and leave serial port 18 by way of bidirectional data transmission channels "0", "1" . . . "L" in bus combinations as follows. Unless otherwise noted, each data transmission channel is identified by bus 22 having eight lines interconnecting serial port 18 and station interfaces. Going from serial port 18 are six lines carrying the DR, S0, S1, CP, L and CPW signals. Coming into serial port 18 are two lines carrying the DL and INT signals. Signal levels for the DR, S0, SI, CP and L lines from serial port 18 to each data transmission channel conform to the standard Xerox Model 530 output voltage specification. That is, a high or "1" output pulse level being +8 volts fed through 2.2K ohms; and a low or "0" pulse level being zero volts with the ability to "sink" 20ma.

All other signal levels for lines interconnecting serial port 18 and station interfaces have voltage levels of ±6 volts. Thus, while the actual logic used on each station interface is TTL (transistor-transistor logic), the information transmitted from one point or station to another is at this higher voltage level. This higher voltage level is the same as that in Electronic Industries Association (EIA) RS232 specifications, namely ±6 volts at about 5K Hz. over a twisted pair of wires. The transmission voltage level translation is done to enhance the data communication system's noise tolerance. It will be noted that the system logic is designed using TTL levels in the station interface as reference because of an inversion presented by each receiver and transmitter in an interface station. The actual voltage levels on the data transmission line segments are logical inversions of what is found inside each station interface, namely, to produce a positive going data pulse in the station interface, computer 14 must issue a pulse which goes from ±8 volts to 0 volts.

Referring back to computer 14, because of the serial-access feature of this computer, any actual number of bidirectional data transmission channels may be employed to and from serial port 18. For illustrative purposes, channel "0" is designated a preset channel and carries all of the DR, DL, S0, SI, CP, L, CPW and INT signals in bus 22 to and through a string of serial-to-parallel station interfaces 23 which are detailed in FIG. 2, and operate according to the truth table in FIG. 4. The string of station interfaces 23 are labeled "0" to "M" in FIG. 1 and on channel "0" their individual station identification ranges from "0-0" to "0-M". There are corresponding residence designations in the storage fields of computer memory 16.

The string of serial-to-parallel station interfaces designed "0-0" to "0-M" in FIG. 1 provide remote preset interfaces where the serial station frame "N" is equal to 16-bits for such parameters as roll gap, roll speed and exit thickness in automated rolling mill process 10. The string of station interfaces 23 are used during an input cycle to read the manually set digital presets 24 fed over cable 25, the digital presets 24 being exemplified in FIG. 2 as contact closures from thumbwheel switches. In addition, the same string of station interfaces 23 is used during an output cycle to output the parallel digital roll gap, roll speed and exit thickness parameter signals through cable 26 and into conventional D/A converters 27. Here the digital parameter signals are converted back to analog parameter signals and are fed over leads 30 to process controllers 31. These controllers in turn act on process actuators 32 to close the process 10 control loop.

Figure 2:
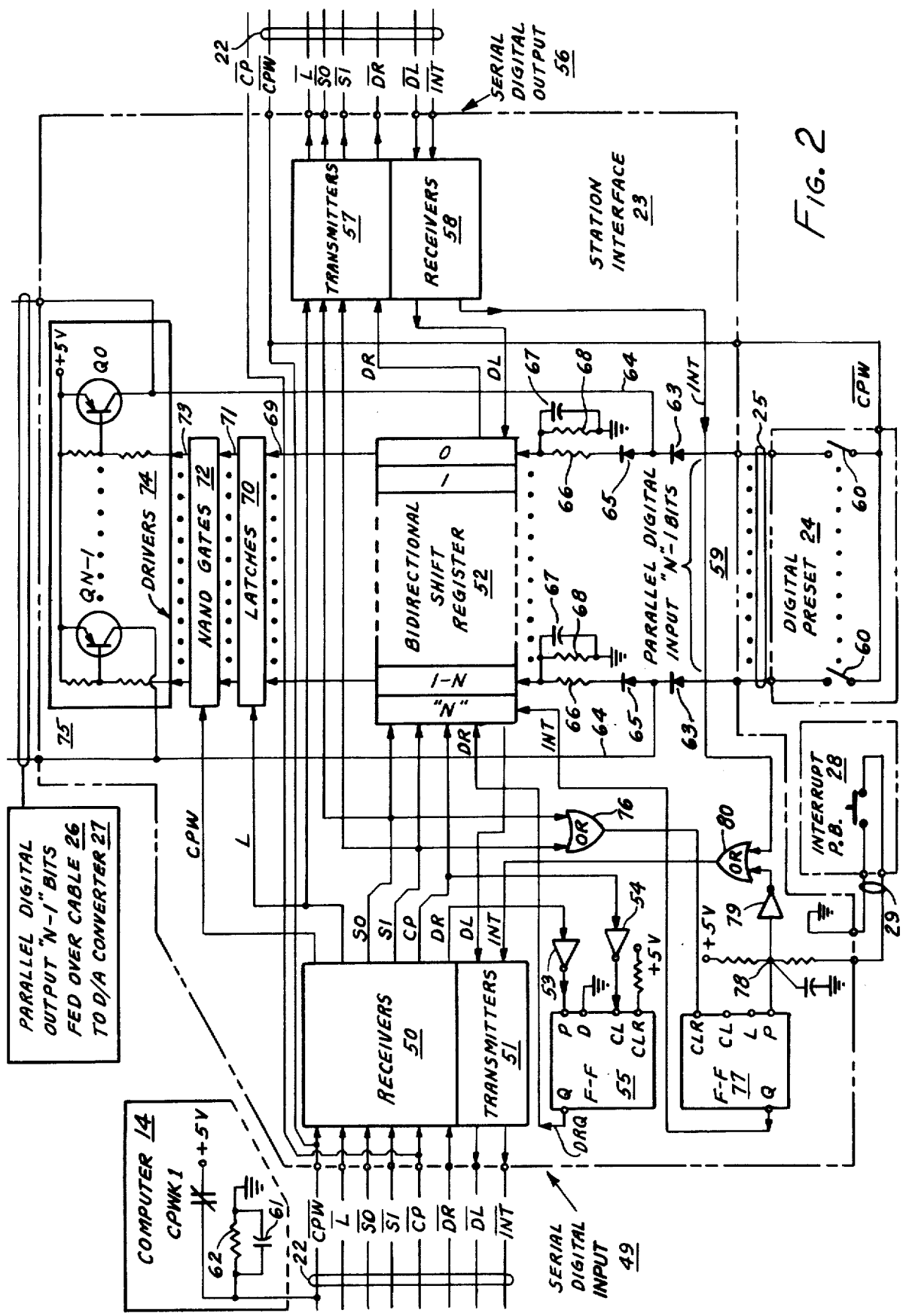
FIG. 2 is a schematic diagram of one station interface used in the invention shown in FIG. 1.

It should be noted that all roll gap, roll speed and exit thickness set-up outputs for rolling mill control pass from computer 14 through preset channel "0" on bus 22. Computer 14, during an input verify cycle programmed by drive software 19a, reads back the actual output settings of station interfaces 23 designated "0-0" through "0-M" just before the L and CPW control signals actually cause the parallel digital output signals to appear on cable 26 and enter D/A converter 27. Each station interface 23 is designed to pass all bit information through it bidirectionally and to include the functions fo threshold detection and retransmission of data and control signals at RS232 compatible voltage levels. In addition, each station interface 23 parallel output on present channel "0" during a read-back, or input verify, cycle of operation is fed internally to each interface station parallel input, as shown in FIG. 2, to reload a shift register in each interface with the same station frame bit data appearing at its parallel output, thereby leaving the shift register contents unchanged during the read-back cycle of operation. This feedback arrangement also enchances the digital data communication system's noise tolerance.

In addition to the foregoing provisions, each station interface 23 designated "0-0" through "0-M" has interrupt provisions. This is effected by a man-made closure of any interrupt pushbutton 28, which establishes the INT signal, and then feeding the INT signal over lead 29 to the individual station interface, all according to the detailed wiring shown in FIG. 2 and described below. Each interface station 23 includes means for transmitting the INT signal to computer 14, as well as means for transmitting in parallel INT signals orginating at succeeding station interfaces on present channel "0". The INT signal alerts computer 14 as to when an interface station should be read because of a change in setting in digital preset 24. This precludes endless scanning by computer 14 to detect a change in digital status of any station interface 23 on preset channel "0".

Still referring to FIG. 1, the serial digital data entering and leaving serial port 18 on channel "1" is designated the terminal and display channel. Channel "1" carries the DR, S0, SI, CP and L signals on five lines going from serial port 18, and carries the DL and INT signals over two lines into serial port 18, all by way of the seven-line bus 33. This bus interconnects serial port 18 with serial-to-parallel station interfaces 34 and 41, which interfaces are labeled "0" to "M" in FIG. 1 and their individual station identification is designated as "1-0" through "1-M" in channel "1". There are corresponding residence designations in the storage fields of computer memory 16. Functions and signal levels are the same for channel "1" as for channel "0", except that because there is no CPW control signal on channel "1", only a parallel input signal verification is made of the digital status of any interface station. In other words, there is no parallel output signal verification on channel "1".

The string of serial-to-parallel station interfaces 34 and 41 designed "1-0" to "1-M" in FIG. 1 illustrate two types of terminal and display data transmission provisions of channel "1". Station interface 34, which is detailed in FIG. 3 and operates according to the truth table in FIG. 4, accommodates a digital terminal device having, for example, a serial station frame "N" equal to 64-bits with two of those bits being designated interrupt bits. Interface station 41 is, for exemplary purposes, three interface stations 34 in one unit and accommodates a digital display device having, for example, a serial station bit frame "N" equal to 192-bits of input/output with six of input bits being designated as interrupt bits.

During an input cycle controlled by drive software 19a: station interface 34 labeled "1-0" is used to read the manually set input switch 35 closures over cable 36; and station interface 41 labeled "1-M" is used to read the manually set input switch 42 closures over lead 43. In addition, during an output cycle: station interface 34 labeled "1-0" is used to output the parallel digital terminal signals over cable 37 to digital terminal device 38; and station interface 41 labeled "1-M" is used to output the parallel digital display signals over cable 44 to digital display device 45. All terminal and display outputs pass from computer 14 through channel "1" on bus 33 and are validated during an input verify cycle programmed by drive software 19a. Station interfaces 34 and 41 have the same additional feature mentioned above for station interface 23.

Terminal device 38 may be a remote CRT device which is used to service a graphical-alpha-numeric display. The CRT device also serves as a diagnostic terminal for online troubleshooting of defective interface stations on all data transmission channels. Display device 45 is used to provide a visual BCD readout of the actual settings that will be transferred into the preset station interfaces on channel "0" prior to threading the next bar into the rolling mill in process 10. It should be noted that there is no direct hardware connection between the preset channel "0" and the digital display device 45 on channel "1".

Each interface station 34 and 41 used on channel "1" has two- and six-bit interrupt provisions as mentioned above. This is effected by man-made closure of any interrupt pushbutton 39, which establishes the INT signal, and then feeds the INT signal over lead 40 to the individual interface station. All of this is done according to the detailed wiring shown in FIG. 3 and described below. Each interface station 34 and 41 includes means for transmitting the INT signals over a single INT line to computer 14, as well as means for retransmitting in parallel INT signals originating at succeeding station interfaces on channel "1". The INT signal alerts computer 14 as to when an interface station should be read because of a change in setting of a switch contact in manual input device 35 or 42.

Again referring back to computer 14, channel "L", or the programming channel, carries serial digital data signals to and from serial port 18 and series-to-parallel interface station 46, and others, by way of a seven-line bus 33. Station interface 46 consists of two station interfaces 34 in one and is designated "L-0" on channel "L". Other interfaces would be identified as station "L-1", etc. There are corresponding residence designations in the storage fields of computer memory 16. Channel "L" carries the same data, control and interrupt signals, and has the same functions and signal levels as does channel "1".

Station interface "L-0" accommodates a digital programmer's panel 47 which has a serial station frame "N" equal to 128-bits with four of these bits being designated interrupt bits. This station interface operates on programmer's panel 47 by way of cable 48 under input and output cycles controlled by drive software 19a, the same as do channel "1" station interfaces. Programmer's panel 47 is used to provide support for various programming aids such as displaying core, changing core, activation or suppression of various systems programs and the like. Four interrupt bits are available for use as required at station "L-0" by the programmer's panel 47, and operate in the same manner as the INT signals on channel "1".

STATION INTERFACES

A detailed description of the station interface 23 will now be made with references to FIG. 2 schematic diagram, FIG. 4 truth table, and FIGS. 5 and 6 timing diagrams. Generally, bus 22 carries all of the digital data station bit frame signals, control signals and interrupt signals to and from each station interface 23 in their +8 volt or ±6 volt complementary form. That is, the $\overline{DR}$, $\overline{DL}$, $\overline{S0}$, $\overline{S1}$, $\overline{CP}$, $\overline{L}$, $\overline{CPW}$, and $\overline{INT}$ data, control and interrupt signals are actually the logical inversions of the positive TTL signal logic used within station interface 23 and illustrated in FIGS. 5 and 6 timing diagrams. Most of the components within station interface 23 are commercially available solid-state devices, for example, integrated circuit chips. Such devices include; TTL logic elements; receivers for inverting and reducing bus 22 signal levels to the TTL signal level; and transmitters for inverting and increasing the TTL signal level to bus 22 signal levels and retransmitting these signals to computer 14 or other station interfaces 23.

Each station interface 23 has a serial digital input 49 adapted to be connected to bus 22. Six of the eight lines carrying the $\overline{DR}$, $\overline{S0}$, $\overline{S1}$, $\overline{CP}$, $\overline{L}$, and $\overline{CPW}$ input signals are connected to individual inputs of receiver 50 for inversion and reduction of these six signals. Receiver 50 is a six-line device having six individual N8T16A chip receivers from Signetics. The other two lines in bus 22 carrying the $\overline{DL}$ and $\overline{INT}$ output signals are connected to individual outputs of transmitter 51 which inverts and increases these two signals. Transmitter 51 is a two-line device consisting of a dual 4-input NAND driver chip N8T15A from Signetics.

Receiver 50 output signals S0, S1 and CP are fed to corresponding serial inputs of bidirectional shift register 52. In addition, output signals DR and CP from receiver 50 are fed to the inputs of individual inverter amplifiers 53 and 54. Outputs from amplifiers 53 and 54 are fed respectively to the preset (P) and clock (CL) inputs of "D" type flip-flop 55 which, for example, is one-half of a N7474A chip from Signetics. The remaining inputs of flip-flop 55 are data (D), which is grounded, and direct clear (CLR), which is connected high to a +5 volt supply. At the Q output of flip-flop 55 there is a positive-going DRQ pulse which is fed to a DR input of shift register 52 so that, during the output phase of an output cycle, a high DR pulse will always be applied to the DR input of shift register 52 whenever a CP high bit is applied to the CP input. This permits the time interval between the DR pulse, which causes a high input, and the CP pulse to be of arbitrary length without any loss of data.

Bidirectional shift register 52 consists of two-N74198N, 8-bit, multifunctional shift register chips from Signetics that are connected in series to accommodate a preset station interface where bit frame "N" is equal to 16-bits. In such a station bit frame, there are 15-data bits numbered "0", "1" ... "N-1" reading right to left; the "N"th bit, or 16th bit, is an interrupt bit; and there are no protocol information bits. Each N74198N shift register chip includes: a clock pulse (CP) input (active high going edge); right-shift (DR) and left-shift (DL) serial input-output; a parallel input; a parallel output; and a direct overriding master clear line (CL) (active low). This shift register is modified to disable CL by tying this input high to +5 volts. In addition, shift register mode control S0 and S1 inputs are provided to control operation of bidirectional shift register 52 according to the truth table in FIG. 4.

Interface station 23 is also provided with a serial digital output 56 which includes transmitter 57 and receiver 58. The S0, S1 and L signals outputted from receiver 50, together with a DR signal outputted from shift register 52, are fed to the input of transmitter 57. Transmitter 57, which is a four-line device having the same driver chips as transmitter 51, inverts and raises the signals for retransmission over bus 22 to succeeding station interfaces. The $\overline{CP}$ and $\overline{CPW}$ signals are parallel-fed through station interface 23 from serial digital input 49 to serial digital output 56 without inversion or change in signal level. Receiver 58, which is a two-line device having the same receiver chips as receiver 50, inverts and lowers incoming $\overline{DL}$ and $\overline{INT}$ signals. The DL signal is fed into and out of a corresponding input and output on bidirectional shift register 52. The INT signal is fed into and out of logic devices described below. Both the DL and INT signals are fed into two-line transmitter 51 where they are inverted and raised to bus 22 signal level and retransmitted to preceding interface stations 23 or computer 14.

Further, each interface station 23 is provided with parallel input 59 which is adapted to receive "N"-1 parallel bit signals, or in the present example, 15-bit signals from a corresponding number of thumbwheel switches 60 in digital preset 24 by way of cable 25. Thumbwheel switch 60 contact settings represent a parameter preset in binary coded form and the 15-bit parallel signals fed to parallel input 59 are controlled by the presence or absence of the CPW signal. The CPW signal, which is generated in computer 14 by drive software 19a, originates from a +5 volt source and is controlled by normally-closed relay contact CPWK1. After the CPWK1 contact opens, the CPW signal is maintained momentarily at the +5 volt level by the charge on capacitor 61, then resistor 62 bleeds off the charge on capacitor 61 until the CPW signal becomes low.

Returning to the parallel input 59, each of the 15-bit parallel signals fed from digital preset 24 by way of cable 25 are fed through individual input circuits to the parallel input of bidirectional shift register 52 mentioned above. Each of the individual input signals pass through diode 63, input and feedback lead 64, diode 65, limiting resistor 66 and into one of shift register 52 bit segments labeled 0, 1 ... "N"-1. When the signal on each of the input circuits is high and then interrupted by the opening of CPWK1 contact, the charge on capacitor 67 maintains the input signal high momentarily until bled off to a low level by resistor 68. Elements 66, 67, and 68 function together as an attenuator-filter network.

Diodes 65 are placed in the parallel input circuits of shift register 52 to protect its chip from −18 volt transients that may feed back over lead 64 from possible use of relays in external D/A converter 27 whenever either the computer read button 21, or its computer 14 equivalent, is depressed. Diodes 63 are placed in the parallel input circuits to prevent computer 14 output from feeding back through the deenergized but closed thumbwheel switches 60 and spuriously setting bit segments of shift register 52. In the event of a shorting failure of any diodes 63, the actual pattern presented to shift register 52 inputs under computer 14 control will be the logical "ORing" of the manual thumbwheel and computer set transistor driver switches noted below. This condition would result in computer 14 being taken off line by drive software 19a.

The 15-bit parallel output signals of bidirectional shift register 52 are active low and are connected by way of leads 69 to latches 70. Latches 70 consist of two series-connected, 10-bit N8202N buffer registers from Signetics having: spare bit capacity; a latch input receiving the L signal from receiver 50 output; and a reset input which is not used by tying it high to +5 volts. The presence of a high latch L signal will produce a high 15-bit output for latches 70. The TTL chip used in this latch, as well as the other 8000 series Signetic chips, have a higher noise tolerance and are therefore better suited for a steel rolling mill environment than their 7400 series TTL counterparts.

The 15-bit active high outputs from latches 70 are fed over leads 71 to the inputs of NAND gates 72. These gates consist of four series-connected N7400A chips from Signetics and each chip has four dual-input gate circuits, thereby providing a 16-bit capacity. One of each dual input is connected to the individual 15-bit high active outputs from latches 70. The other of each dual input is connected in parallel and circuited to receive a high CPW signal from receiver 50 which, in turn produces a low active 15-bit output at NAND gates 72.

Parallel leads 73 provides a 15-bit connection to the input of drivers 74, the latter consisting of a plurality of 2N2997A transistors labeled Q0 ... QN-1. Each of these transistors has an emitter connected to a +5 volt source and their bases are biased from this same source. Each collector is circuited to a corresponding one of the segment "0" ... "N"-1 feedback leads 64 and to parallel digital output 75. Thus, when the CPW signal is low all of the transistors are "cut-off" or inactive. When the CPW signal is high the output pattern from the latches 70 feeds to the transistors 74 and in turn to the parallel inputs of bidirectional shift register 52 as well as the parallel digital output 75. Also when CPW is high the voltage to the Digital Preset 24 is zero. The feedback path enables verification of both parallel input and output. This output is then fed over cable 26 to the external D/A converter 27.

When referring to the FIG. 4 truth table, it will be noted that bidirectional shift register 52 has four control modes. First, when both the S0 and S1 signals are low, there is a "do nothing" state and the clock pulse CP input is inhibited. Also, the listed flip-flop are cleared from holding information identifying which interrupt signal source activated computer 14. Second, when the S0 signal is low and S1 signal is high, data shifts left synchronously and new data enters at the shift-left (DL) input from receiver 58 and is retransmitted by transmitter 51 in the direction of computer 14. Third, when the S0 signal is high and the S1 signal is low, data shifts right synchronously with the rising edge of the clock pulse CP. Serial data for this mode is entered at the shift-right (DR) data input from receiver 50 and is retransmitted by transmitter 51 away from computer 14. Fourth, when the S0 and S1 signals are both high, and after a positive transition of the clock input (CP) occurs, synchronous parallel loading takes place. During parallel loading, serial data flow is inhibited. As a result, all of the digital preset bits "0" . . . "N"-1 (15-bits) from parallel digital input 59 are effectively transferred to parallel digital output 75, provided the L and CPW signals were active as described above.

In addition to passing data through its inputs and outputs, station interface 23 has an interrupt capability which will now be described, again referring to FIG. 2. Both of the S0 and S1 outputs from receiver 50 are applied to the inputs of OR gate 76 which detects the "do nothing" state of the input signals. When S0 and S1 both become zero, the OR gate's output falls to zero which clears flip-flop 77. This clears the Q output and the INT segment, or "N" bit, of shift register 52. Flip-flop 77 is a "D" type flip-flop. OR gate 76 is one of four dual-input positive OR gates housed in a N7432A chip from Signetics.

A +5 volt signal at junction 78 is reduced momentarily to near ground level when interrupt pushbutton 28 is closed to complete a circuit through lead 29 to ground. The momentary reduction of voltage at junction 78 causes two interrupt actions. First, the present (P) input of flip-flop 77 goes low and causes the Q output to go high with an internal interrupt signal and sets the INT segment, or "N" bit, high in shift register 52. Thus, when serial data is shifted left, this bit will be in the station bit frame. Second, a momentary high is produced at the output of inverter amplifier 79 which is fed to the input of positive OR gate 80, the latter also being housed with gate 76. OR gate 80 merges the internal interput signal with the external INT signal outputted from receiver 58 and produces a combined or parallel INT signal which is fed to the input of transmitter 51. The $\overline{INT}$ signal outputted from transmitter 51 is fed over bus 22 to alert computer 14 of an interrupt condition.

Station interface 34 will now be described by referring to FIGS. 3, 4, 5 and 6. Bus 33 carries all of the digital data section bit frame signals, control signals and interrupt signals to and from each station interface 34 in their +8 volt or ±6 volt complementary form. That is, the $\overline{DR}$, $\overline{DL}$, $\overline{S0}$, $\overline{S1}$, $\overline{CP}$, $\overline{L}$ and $\overline{INT}$ data, control and interrupt signals are actually the logical inversion of positive TTL signal logic used within station interface 34 and illustrated in FIGS. 5 and 6 timing diagrams. Most of the components within station interface 34 are commercially available solid state devices, such as integrated circuit chips. Unless otherwise stated, these devices correspond to the same or similar devices used in station interface 23 described above and provide the same function as well. That is, receivers herein correspond to receivers 50; transmitters herein to transmitters 51; bidirectional shift register herein to shift register 52, except for the difference in bit numbers; latches herein to latches 70; flip-flops herein to flip-flop 55; and OR gates herein to OR gate 76.

Each station interface 34 has a serial digital input 81 adapted to be connected to bus 33. Five of the eight lines carrying the $\overline{DR}$, $\overline{S0}$, $\overline{S1}$, $\overline{CP}$ and $\overline{L}$ input signals are connected to individual inputs of five-line receiver 82 for inversion and reduction of these five signals. The other two lines in bus 33 carrying the $\overline{DL}$ and $\overline{INT}$ signals are connected to individual outputs of two-line transmitter 83 which inverts and increases these two signals.

Receiver 82 output signals S0, S1 and CP are fed to corresponding serial inputs of bidirectional shift register 84. In addition, output signals DR and CP from receiver 82 are fed to the inputs of individual inverter amplifiers 85 and 86. Outputs from these amplifiers are fed respectively to the preset (P) and clock (CL) inputs of "D" type flip-flop 87. The remaining inputs of flip-flop 87 are data (D), which is grounded, and direct clear (CLR), which is connected to a +5 volt supply. At the Q output of flip-flop 87 there is a positive-going DRQ pusle which is fed to a DR input of shift register 84 so that, during the output phase of an output cycle, a high DR pulse will always be applied to the DR input of shift register 84 independent of the time interval between DR and CP.

Bidirectional shift register 84 consists of eight, 8-bit, multifunctional shift register chips that are connected in series to accommodate a station interface where bit frame "N" is equal to 64-bits. In such a station bit frame, there are 62-data bits numbered "0", "1", . . . "N-2" reading right to left; the "N"-1 and "N"th bit, or 63rd and 64th bits, are interrupt bits; and there are no protocol information bits. Each shift register chip is the same as those in shift register 52 and the same S0 and S1 mode control inputs are provided to control operation of bidirectional shift register 84 according to the truth table in FIG. 4.

Interface station 34 is also provided with a serial digital output 88 which includes transmitter 89 and receiver 90. The S0, S1, CP and L signals outputted from receiver 90, together with a DR signal outputted from shift register 84, are fed to the input of transmitter 89. Transmitter 89, which is a five-line device having the same driver chips as transmitter 83, inverts and raises the signals for retransmission over bus 33 to succeeding station interfaces. Receiver 90, which is a two-line device having the same receiver chips as receiver 82, inverts and lowers incoming $\overline{DL}$ and $\overline{INT}$ signals. The DL signal is fed into and out of a corresponding input and output on bidirectional shift register 84. The INT signal is fed into and out of logic devices described below. Both the DL and INT signals are fed into two-line transmitter 83 where they are inverted and raised to bus 33 signal level and retransmitted to preceding interface stations 34 or computer 14.

Further, each interface station 34 is provided with parallel input 91 which is adapted to receive "N"-2 parallel bit signals, or in the present example, 62-bit signals from a corresponding number of input switches 92 in manual input switches 35 by way of cable 36. Manual input switch 92 contact settings represent digital terminal parameters in binary coded form and the 62-bit parallel signals fed to parallel input 91 are dependent upon the presence of a +5 volt supply.

Still referring to the parallel input 91, each of the 62-bit parallel signals fed form manual input switches 35 by way of cable 36 are fed through individual input circuits to the parallel input of bidirectional shift register 84 mentioned above. Each of the individual input signals pass through limiting resistor 93 and into one of shift register 84 bit segments labeled 0, 1 . . . "N"-2. When the signal on each input circuit is high and then interrupted by the opening of any of the input switches 92, the charge on capacitor 94 maintains the input signal high momentarily until bled off to a low level by resistor 95. The combination of elements 93, 94, and 95 function as an attenuator-filter network.

There is no diode protection or output feedback to input provided in station interface 34. However, should this arrangement be required, reference to station interface 23 shown in FIG. 2 will provide the appropriate circuitry.

The 62-bit parallel output signals of bidirectional shift register 84 are active low and are connected by way of leads 96 to latches 97. Latches 97 consist of seven series-connection 10-bit buffer register chips the same as latches 70. A latch input receiving the L signal from receiver 82 causes a high 62-bit output at latch 97 when the L signal goes high.

These 62-bit latch output signals are fed over leads 98 to drivers 99 which consist of 16-four channel relay drivers UHP-407 from Sprague. The binary output signals from drivers 99 is active high and applied at parallel digital output 100 which has "N"-2 bits, or 62-bits in this example. This output is fed over cable 37 to digital terminal 38.

Operation of bidirectional shift register 84 is the same as shift register 52. That is, it is under control of the S0 and S1 signals which establish the four control modes listed in FIG. 4 truth table. During parallel loading, all of the contact settings of manual input switches 35 applied to parallel digital input 91 are transferred to the bidirectional shift-register 84. The settings can then either be input to the computer, effectively transferred to the parallel digital output 100 via the latches 97, or both.

In addition to passing data through its inputs and outputs, station interfaces 34 has an interrupt capability which will now be described, again referring to FIG. 3. Both of the S0 and S1 outputs from receiver 82 are applied to the inputs of OR gate 101 which as before detects the "do nothing" state of the input signals. The occurrence of this state is used to clear "D" type flip-flops 102 and 103. Thus their Q outputs and the INT segments, or "N" and "N-1" bits of shift register 84 are reset to the low state following S0 and S1 both being low. OR gate 101 is one of four dual-input positive OR gates the same as OR gate 76.

A +5 volt signal at either junction 104 or 105 is reduced momentarily to near ground level when interrupt pushbutton 39a or b is closed to complete a circuit through lead 40 to ground. The momentary reduction of voltage at junctions 104 and 105 each cause two interrupt actions. First, the preset (P) input of flip-flops 102 and 103, respectively goes low and causes their Q outputs to go high with an internal interrupt signal and set the INT 1, and INT 2 segments, or "N" and "N"-1 bits, high in shift register 84. Thus, when serial data is shifted left, these bits will be in the station bit frame. Second, a momentary high is produced at the output of inverter amplifiers 106 and 107 which is fed respectively to the inputs of positive OR gate 108, the latter also being housed with gate 101. OR gate 108 output is the internal interrupt signal and is fed to OR gate 109. OR gate 109 merges the internal interrupt signal with the external INT signal outputted from receiver 90 and produces a combined or parallel INT signal which is fed to the input of transmitter 83. The $\overline{\text{INT}}$ signal outputted from transmitter 83 is fed over bus 33 to alert computer 14 of an interrupt condition.

SOFTWARE

Computer 14 generates data and control signals and processes external interrupt signals from data transmission channels under control of software drive 19a. These signals include: the $\overline{\text{DR}}$, $\overline{\text{DL}}$, $\overline{\text{S0}}$, $\overline{\text{S1}}$, $\overline{\text{CP}}$, $\overline{\text{L}}$, $\overline{\text{CPW}}$, and $\overline{\text{INT}}$ signals which are shown in FIGS. 5 and 6 input and output cycle timing diagrams along with a typical bit stream entering or leaving any of the data transmission channels "0", "1" . . . "L". In FIGS. 5 and 6, a station bit frame without protocol information is illustrated as having "N" bits which, in the case of preset data transmission channel "0" described above, will be referred to hereinafter as a 16bit station frame. While the other data transmission channels may have a greater number of bits per frame, they are not involved in data verification and other features of the preset channel. Further, the data left (DL) line sampling occurs slightly beyond the onset of clock pulse (CP). The $\overline{\text{DL}}$ signal is shown in two complementary forms, but only one is used at a time, the value of which depends upon the data. Moreover, the first bit out of shift register 52 on a shift-left frame is the interrupt ($\overline{\text{INT}}$) bit; or when using shift register 84, the first two bits out on a shift-left frame are the interrupt ($\overline{\text{INT}}$) bits.

Computer 14 has various operating cycles, or modes, which include: READ; SHIFT, supported by SHIFT INPUT, and SHIFT OUTPUT; PRESET; and ON-LINE DIAGNOSTICS. FIGS. 7 to 11 are flow charts of those portions of software 19a pertaining to all but the first and last of these operating cycles. It is believed the first and last operating cycles will be readily apparent to those having ordinary skill in the art.

SHIFT, SHIFT INPUT, SHIFT OUTPUT

The program SHIFT, including SHIFT INPUT and SHIFT OUTPUT, which are shown in FIGS. 7A, 7B, 8 and 9 flow charts, are used to transmit data to or from any one of the data transmission channels "0", "1" . . . "L". In these flow charts reference is made to SR which means a data transmission channel that has a shift register in one of the station interfaces, for example, interface 23.

Figure 7A:
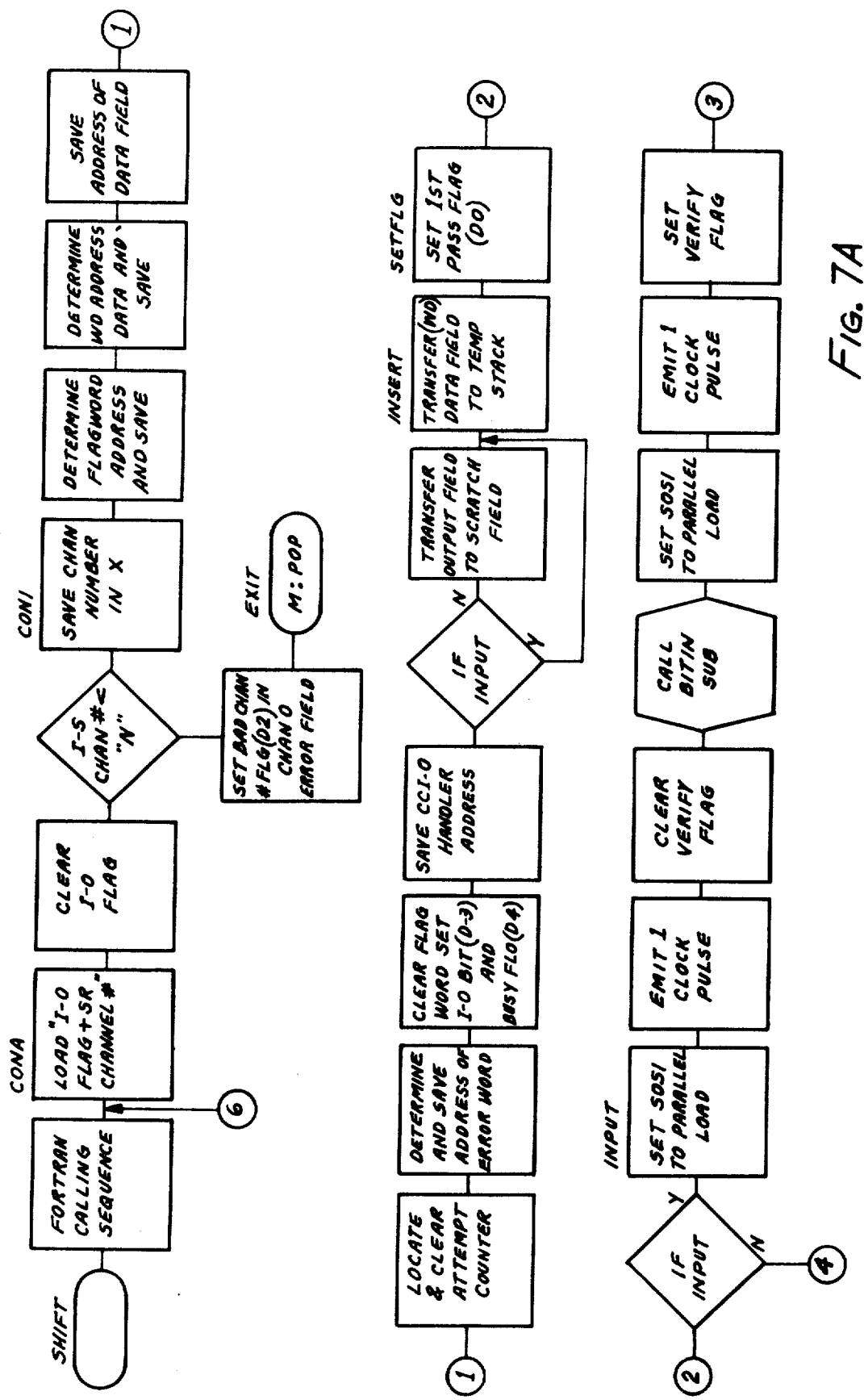
FIGS. 7A and 7B are flow charts of a control computer software subroutine referred to as SHIFT (register driver).
Figure 7B:
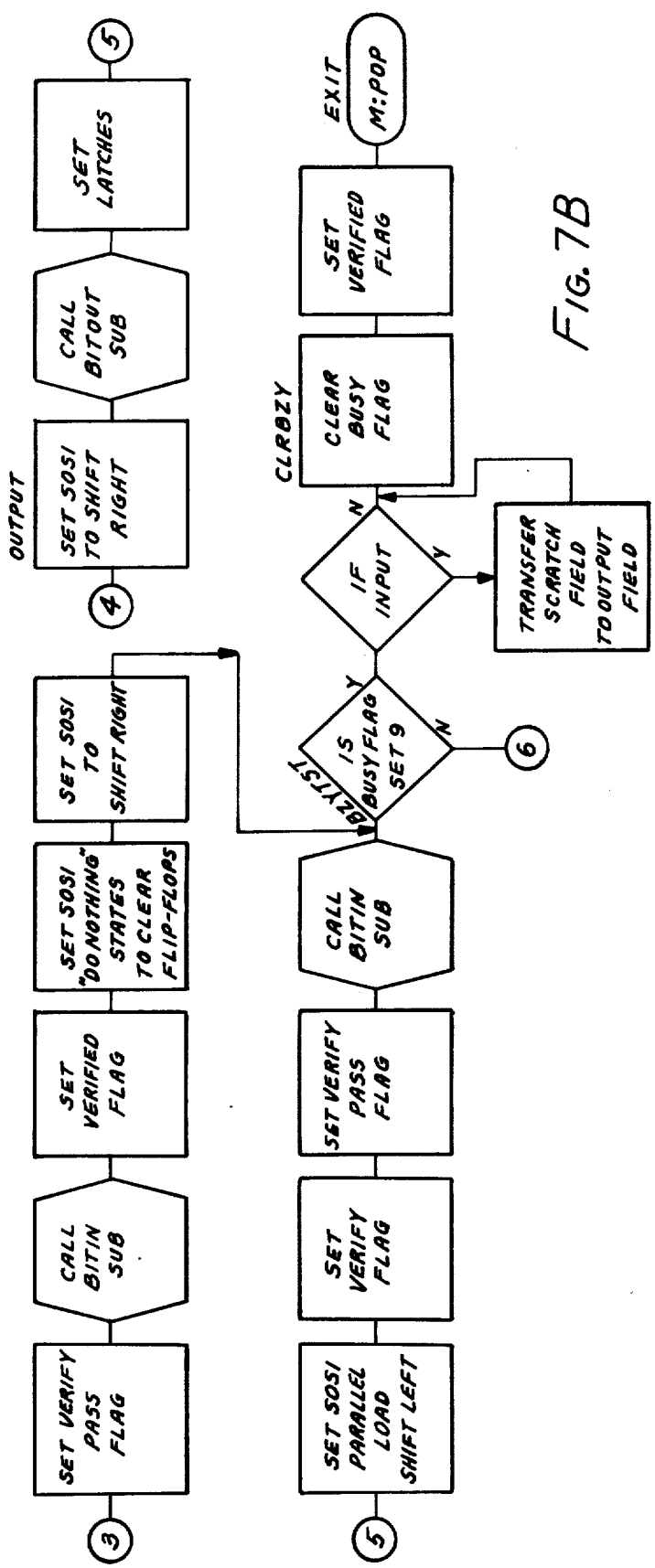

The SHIFT routine illustrated in FIGS. 7A and 7B is a public-library resident routine. That is, it is memory 16 resident in the foreground of computer 14 and thereby able to perform output through the computer's digital input-output system 17. Background programs cannot normally do this without causing protect violations. The SHIFT routine is also reentrant, meansing that its code can be used by several different foreground tasks or even background tasks. The reentrant feature, normally a part of many real-time computer systems, is realized by having the routine reserve in temporary storage associated with each different task a group of memory cells into which all working data is placed. Thus, the executing code is common to all tasks, but the data for each task is kept with each task in its dynamic temporary storage area, rather than within the routine itself.

Thus, the block called "FORTRAN CALLING SEQUENCE" performs the function of calling a monitor routine which reseves the required amount of temporary storage in the calling tasks temporary storage area. As part of the calling sequence, pointers are set up as to the location of any data that needs to be transferred to the routine from the calling program. In the case of SHIFT, one word of data is required to tell SHIFT what to do; it conveys the data transmission channel number and whether an input or output operation (FIGS. 8 or 9) is to be performed.

After the temporary space has been reserved the operation specification word is examined as to the validity of the specified channel number. The I-O specification data in the word is thrown away and the channel number tested against the number of data transmission channels in the system, in this case "L+1". If more than "L+1" channels, numbered "0" to "L" are found, an appropriate error message is requested and control is returned to the calling program with no action having been taken.

If a valid channel number is found, the location of the channel's flagword, input-output slot-address data (WD data), and the data-field are saved. The flagword is simply a collection of flags that are set as the routine proceeds from operation to operation. In case of a malfunction the flagword will contain the flags associated with the set of operations that have been correctly performed.

The location of the attempt counter is also saved and this counter is cleared. By using this counter, if a channel is defective the computer system will not forever try to overcome a hardware failure, but rather will try the specified number of times before continuing on. The address of the channel's error-word in the computer system's error table is also saved. The setting of bits in this word signals to an output program (FIG. 9) the type of message that is to be listed on a logging teletype.

The block "CLEAR FLAG WORD SET I-O BIT (D3) AND BUSY FLAG (D4)" is used to indicate that: one, the flag-word located previously is cleared; two, the input-output bit of this word is set or cleared on the basis of input-output call (FIGS. 8 or 9); and three, the busy flag in the flag-word is set. The "busy-flag" is used to tell whether or not at the completion of an input-output operation, a higher priority task than the original calling task, also called the SHIFT routine and used a particular channel. If a higher priority routine did use the channel, the operation requested by the lower priority routine will have to be restarted from scratch. The logic of the "busy-flag" is quite simple: The flag is always set just before actual channel manipulations get underway. If no one interrupts, the flag will still be set when the input-output operation has completed. If the flag is still set at the operation's end, the input-output flag is cleared.

After saving the location of the routine CCOEX, which routine is used to actually set the flip-flops to their required states, the input-output flag is tested. If an input operation is requested (FIG. 8) control transfers immediately to the block "INSERT WD DATA FIELD TO TEMP STACK". This block moves the slot-address table for the requested data transmission channel into the calling tasks temporary storage. If an output operation is requested instead, (FIG. 9), the output-field is transferred to the scratch field before the slot-address table is moved.

The block "SET 1ST PASS FLAG (D)" sets the flag in the flag word which indicates that the "first phase" of input-output, as opposed to the "verify" phase, is about to be started. Both of these phases are part of the complete operating cycle shown in FIGS. 5 and 6 timing diagrams.

Figure 8:
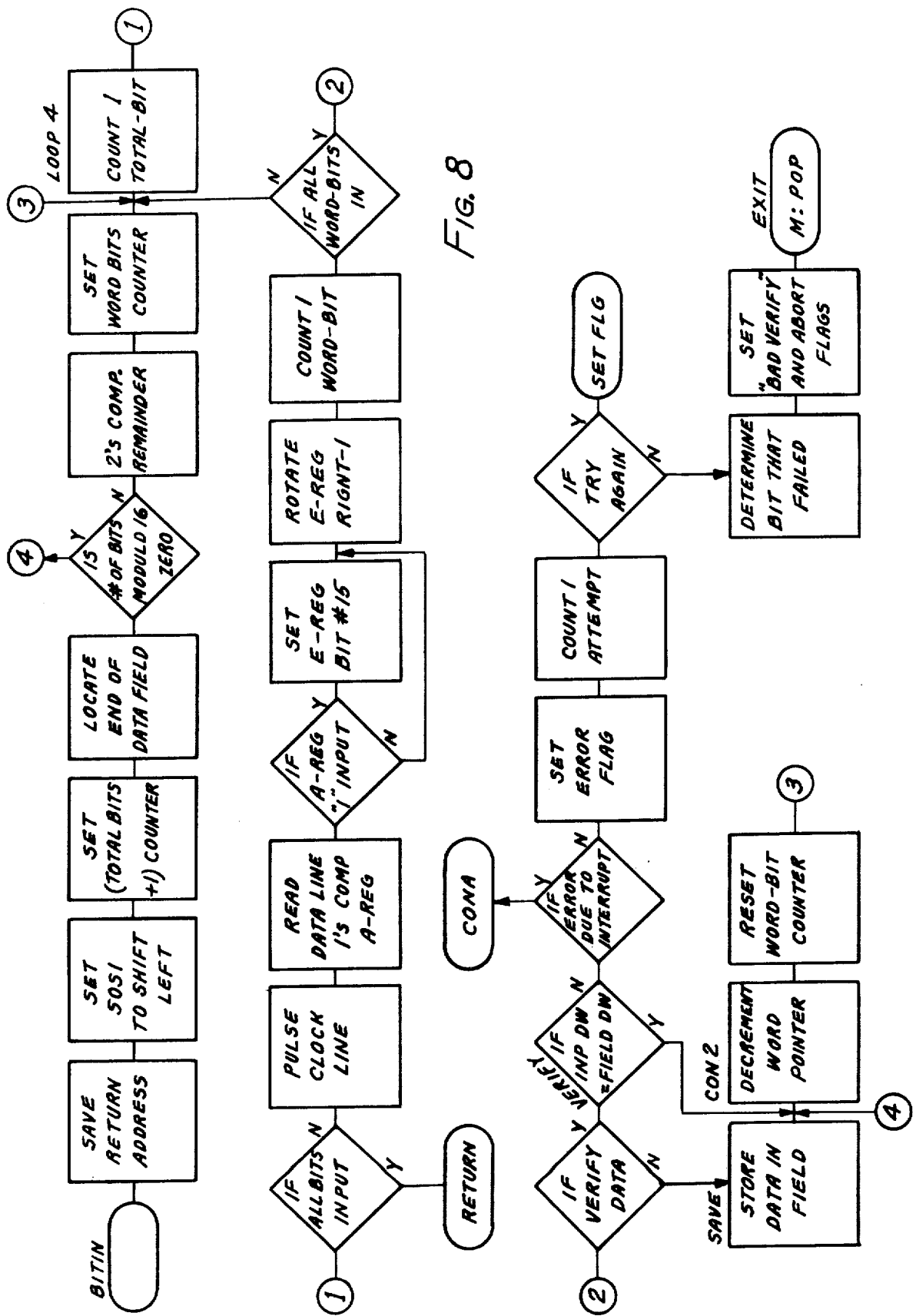

Next, the input-output flag in the flagword is again tested to set-up the call in the input or output subroutines shown in FIGS. 8 or 9, respectively. If an input operation is requested the data transmission channel is set to the "parallel-load" mode by the $\overline{S0}$ and $\overline{S1}$ segments and the data present at the inputs to the shift registers 52 is actually loaded into the shift registers. Following the clearing of the "verify" flag (this is done only to guarantee that the flag is cleared) the subroutine BITIN shown in FIG. 8 is called. The subroutine BITIN performs the function of actually inputing the data from the data transmission channel in serial form, converting it to parallel-word representation, and storing the word in the scratch subfield. After the 1st call to BITIN is completed the data transmission channel is once again loaded with the parallel input data, and the "Verify Pass" flag is set. Next, BITIN is once again called. In the verify mode BITIN functions as before up to the point where memory storage would normally take place, but then a comparison is done with the word that is already in memory. If no errors are found BITIN runs to completion. If an error is found, BITIN computes the specific data transmission channel bit number of the first bit that filed, and sets a bit in the channel's error-word so that this information can be reported out.

Once the second call to BITIN has been successfully completed, the "Verified" flag is set and the "do-nothing" state is sent out on the $\overline{S0}$ and $\overline{S1}$ lines to clear the flip-flops that were holding the identification of any interrupts that occurred. Before control transfers to the Busy Test block the $\overline{S0}$ and $\overline{S1}$ lines are left selecting the shift right (DR) mode.

If an output was requested, the S0 and S1 lines are set to the shift right ($\overline{DR}$) mode and the subroutine BITOUT is called as shown in FIG. 9. This subroutine serializes the memory data to be outputted and sends it out on the data transmission channel. After BITOUT completes its function, an $\overline{L}$ pulse is emitted on the latch line which moves the data just outputted by the BITOUT subroutine into the station interface's latches. Next, the $\overline{S0}$ and $\overline{S1}$ lines are set to the shift left mode ($\overline{DL}$) by way of a brief transition through the parallel load mode. (To go directly from the shift right mode to the shift left mode causes a shift register malfunction.) Next, both the "verify" and "verify pass" flags are set and the subroutine BITIN is called. The data that has just been shifted out is shifted back in and compared with the original data that was to be output.

Following the completion of the BITIN subroutine, the "Busy Flag" is tested. If the "busy" flag is still set, no higher priority task has used the data transmission channel. If this flag has been cleared the entire input-output operation is repeated.

After a successful test of the "busy" flag, the input-output flag is tested. If an input operation was performed the scratch field contains the results of the input operation. Thus, the scratch field is transferred to the input field thereby updating it. If an output operation was specified, the scratch field is not transferred and control converges at the point where the "busy" flag is cleared. Just before exit the "verified" flag is set.

The subroutine TOCCO shown in FIG. 11 sets up the call to the routine CCOEX which is used to set the computer's flip-flop outputs which drive the $\overline{S0}$ and $\overline{S1}$ lines.

PRESET

Figure 10A:
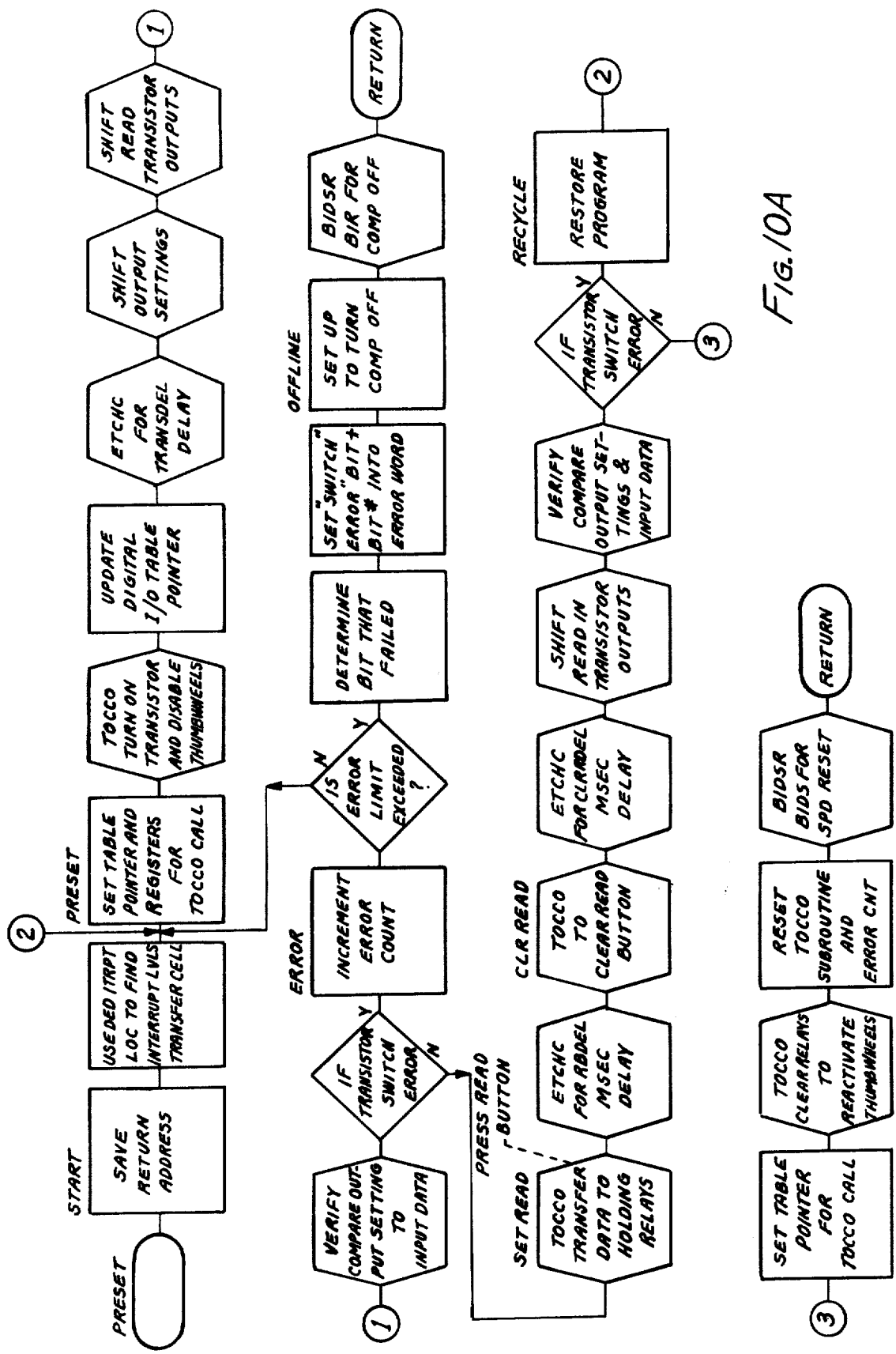
FIGS. 10A and 10B are flow charts of a control computer software subroutine referred to as PRESET.
Figure 10B:
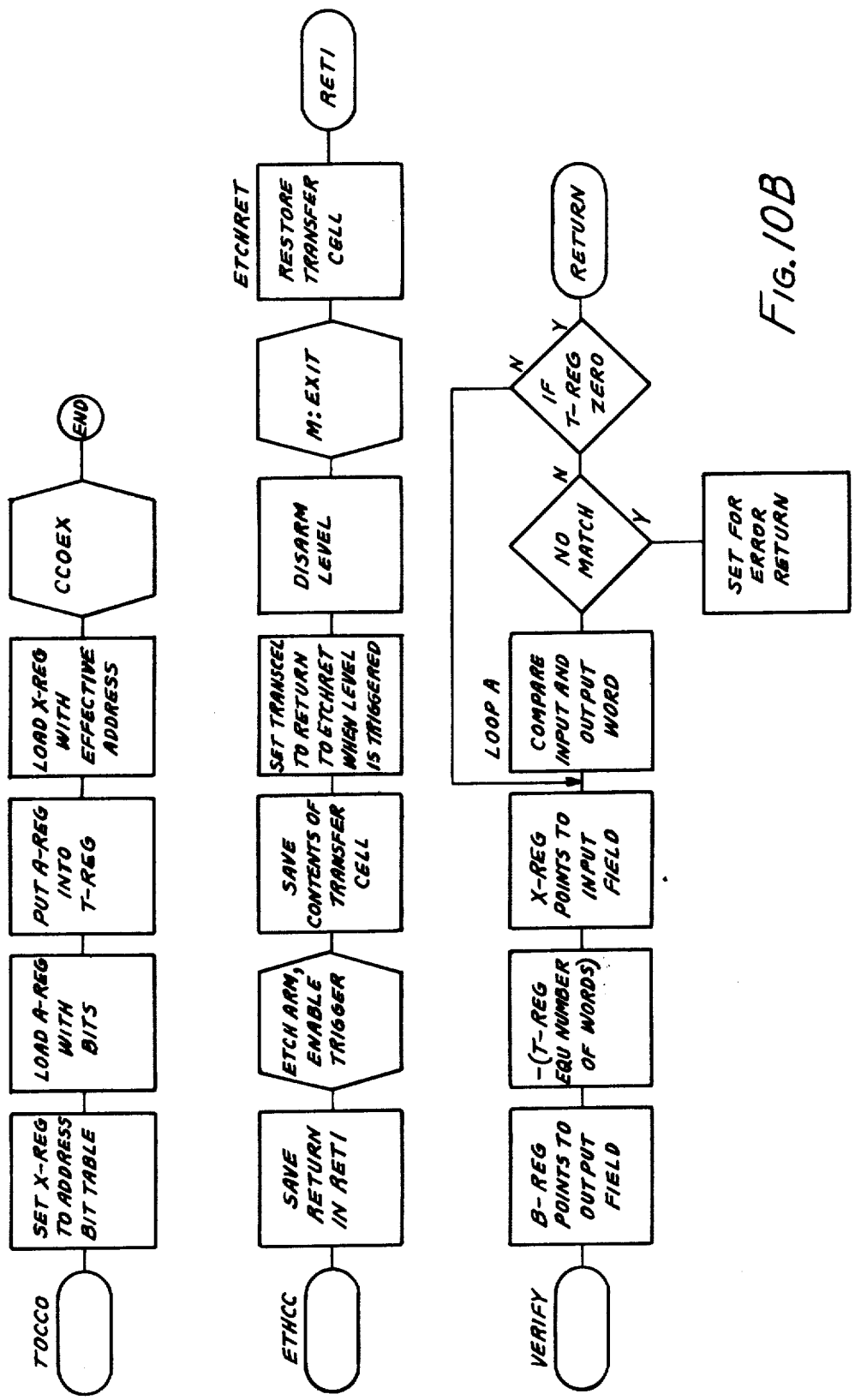

The PRESET routine performs the actual driver 74 sequencing and shift register 52 outputs required to transfer the desired preset information set by thumbwheel switch preset 24 into holding relays or the D/A converter 27. Flow charts for the PRESET routine are shown in FIGS. 10A, 10B and 11.

The routine PRESET is executed in computer 14 within a portion of memory 16 called the SEMI-RESIDENT area. That is, that actual code is not permanently core-resident but rather is called in from disk memory just prior to execution.

When the code has been loaded the SEMI-RESIDENT handler transfers control to PRESET and gives it the location to which control is to be returned after PRESET has finished. The first block, "SAVE RETURN ADDRESS", saves this location.

The block called "USE DED INTRPT LOC TO FIND INTERRUPT LVLS TRANSFER CELL" performs a rather complex function. Basically various pointers in the machine are checked to find the location of the SEMI-RESIDENT's transfer cell. This is the memory location that points to the start of the SEMI-RESIDENT handler. Whenever the SEMI-RESIDENT area is triggered active, which area is a full-fledged foreground task complete with its own hardware priority level, program control flows through the TRANSFER cell to the start of the handler. However, in order to implement time-delays to allow relays to settle after their state has been changed, this transfer cell is modified to point to where PRESET wants execution to resume after the time-delay has elapsed.

The block, "SET TABLE POINTER AND REGISTERS FOR TOCCO CALL", initializes a table which specifies the opening or closing sequence of the relays. TOCCO is a subroutine shown in FIG. 11 which uses this table to set up the calling sequence to the relay contact closure subroutine, CCOEX, which in turn performs the actual setting of the output relays.

The first call to TOCCO turns on all of the preset station interfaces 23 output transistors in driver 74, which action also disables the manual thumbwheel switches 60 in preset 24. Next, the pointer to the relay or other output sequence table is updated in anticipation of its next usage. Following this a call is made to the ETCHC subroutine which is a time delay subroutine not shown that operates from computer 14's real-time clock. The ETCHC subroutine modifies the transfer cell, previously described, to return to the ETCHC subroutine following the expiration of the desired delay. Next the ETCHC subroutine places a call to the computer 14 delay handler ETCH (Elapsed Time Counter Handler), and then exits the level.

After the above delay, called TRANSDEL for transistor delay, the routine SHIFT described above is called which loads all of the latches 70 in the preselected preset data transmission channel and verifies the output data by reading back into computer 14 the bit stream that it originally output. This is not the verification of the data output by the transistor driver 74.

When SHIFT returns control to PRESET, PRESET immediately places another call to SHIFT, only this time the request is to input the data from the preset channel which will be the data-pattern from the output transistor drivers 74. (These transistors were turned-on and the thumbwheels disabled previously).

The block "VERIFY COMPARE OUTPUT SETTING TO INPUT DATA" indicates that after the transistor driver 74 data-pattern has been input, PRESET itself does a comparison between the data in the original output field and the data that has just been read-in. If an error is encountered the error count is incremented. Should the error exceed a given limit, the shift register 52 bit number in the station interface 23 on the preset channel that failed is determined and reported out on, for example, a logging typewriter by setting the appropriate bit in an error table which is periodically scanned by another program. Also computer 14 is taken "Off-Line". BIDSR is a subroutine that calls for the execution of the requested program. If the error limit is not exceeded the entire PRESET program is repeated up to this point.

Once the transistor driver 70 output data-pattern has been verified, PRESET proceeds to effect the relay sequence that will actually move the driver 70 output data into D/A converter 27 and subsequently effect automatic control of the rolling mill process 10 shown in FIG. 1. Computer 14 also picks up a relay which is the equivalent of the manual "READ" button 21, holds if closed for RBDEL msec., opens it, and delays for CLRRDDEL msec.

Next, PRESET performs the block "SHIFT TO READ IN TRANSISTOR OUTPUTS". Verification is made that the output pattern from the transistor driver 74 is still in agreement with the memory-resident output data field. Therefore, the SHIFT routine is called again to read the preset channel. Since the output transistors in driver 74 are still enabled, this call will yield their output pattern. If an error is found, the entire PRESET program is once again executed. If agreement is found, the output transistors in driver 74 are disabled and the thumbwheels 60 are enabled once again. PRESET now returns control to the SEMI-RESIDENT handler.

READ OPERATION

Prior to describing the READ OPERATION, it is believed a brief reiteration of computer 14 and interface station 23 relationships on the preset data transmission channel "0" should be presented.

The computer driven relay CPWK shown in FIG. 2 that switches the $\overline{CPW}$ line voltage and the thumbwheel 60 supply voltage is connected such that each time the computer's reset button 21 is depressed, as during a Bootstrap, the $\overline{CPW}$ line voltage out of receiver 50 is low and the thumbwheel 60 supply voltage is present. This $\overline{CPW}$ line is fed to one of the two inputs associated with each NAND gate 72. The remaining input to each NAND gate is connected to latch 70 which holds computer 14 output pattern. The importance of this is that as long as the $\overline{CPW}$ line feeding the NAND gate 72 inputs is low, the output of each NAND gate 72 will be high, i.e., about 4 volts. The NAND gate 72 output voltage is fed through a base current limiting resistor to the base of a 2N2907A PNP transistor. The other resistor tied to the base of this transistor functions as a pull-up resistor enabling the nearly +4 volt output of NAND gate 72 to cut-off the transistor. With the transistors cut off, the feedback lead 64 connected to the junction with diode 63 is effectively an open circuit. The voltage being delivered to diode 65, and also to the parallel digital output 75, or to relays beyond, comes from the thumbwheel supply voltage $\overline{CPW}$ through the thumbwheel switch 60 and will be either the thumbwheel supply voltage or an open circuit depending upon the state of the thumbwheel switch 60. The voltage after passing through diode 65 is attenuated and filtered before being fed into shift register 52 parallel input lines.

Diodes 65 are present to protect the shift register chip from from the −18 volt transients that may backfeed from the parallel output 75 if relays are used when either the manual read button 21 or its computer driven equivalent is depressed. Diodes 63 are present to prevent computer 14 output from backfeeding through the deenergized but closed thumbwheel switches 60 and spuriously setting bits. In the event of a shorting failure in any diode 63, the actual pattern presented to the shift register inputs under computer control will be the logical "ORing" of the manual thumbwheel 60 and computer set transistors in drivers 74. This condition would of course result in the computer being taken off-line by the drive software 19a.

The READ function of a data transmission channel may be initiated by either computer software 19a that desires to know the current station of certain switches connected to the shift register channel, or in response to a interrupt request by interrupt pushbutton 28 which signals computer 14 by way of the interrupt line $\overline{INT}$ that parallel feeds through each data transmission channel. Actually the interrupt line back into computer 14 is a separate data transmission line $\overline{INT}$ from the lines required to operate the data transmission channel. Operation of the interrupt feature is described above.

INPUT CYCLE OF OPERATION

Computer software 19a uses the interface station 23 to input data and read the thumbwheel 60 states as follows. During normal operation, the transistors in drivers 74 are cut off and the thumbwheel switches 60 energized as mentioned previously. Thus, to read the thumbwheel's switch settings no change in required in the state of the CPWK relay. The first thing that computer 14 accomplishes in the "data-input" mode is to transfer the current reading of the thumbwheel switch lines to shift register 52. To do this, computer 14 sets the $\overline{S0}$ and $\overline{S1}$ lines to the "parallel load" mode and subsequently 1 clock pulse CP. On the leading edge of this pulse CP the voltage output pattern is shown in FIG. 5. Next the $\overline{S0}$ and $\overline{S1}$ lines are set to the "shift left" DL mode. Since the "N"-1 or 15th bit directly feeds the DATA LEFT line DL, computer 14 reads the value of the 15th bit before issuing any clock pulses CP to cause left-shifting. After the value of the 15th bit has been recorded, a clock pulse CP is issued causing shift register 52 to shift left one position. Again the value of DATA LEFT line DL is read and recorded by computer 14. The process of recording and shifting one bit position is repeated until all of the bits in a given data transmission channel have been inputted into computer 14.

Immediately after the input data from the data transmission channel has been read, the entire reading operation is repeated with the data input on the second read being compared against the previously input data on a bit by bit basis. In the event an error is detected, the reading operation is reinitiated from scratch. See the above description of the SHIFT routine for more details about drive software 19a operation. Whenever the reading operation has been successfully completed, as evidenced by an exact input match on the second read, the $\overline{S0}$ and $\overline{S1}$ lines are set such that their outputs from receiver 50 are "zero" momentarily. This momentary zero is detected by OR gate 76 and used to clear flip-flop 77 containing the interrupt information as to the initiating pushbutton 28.

OUTPUT CYCLE OF OPERATION

At the start of the output cycle, the CPWK relay is in the same state as it had for the input cycle, i.e., the thumbwheel switches 60 are connected to their supply voltage and the CPW line feeding NAND gates 72 is low, thereby maintaining the transistors in relay driver 74 in their cut-off state.

The output cycle requires two phases of transmission output and transmission verify. These are shown in FIG. 6 timing diagram as the "output phase" and the "output verify phase" of a complete output cycle of operation.

The first action taken during the transmission output phase is to set the $\overline{S0}$ and $\overline{S1}$ lines to select the "shift right" mode DR. Next, the value of the first bit in shift register 52 to be outputted is examined. See the SHIFT routine described above. If the bit is a "1", a pulse is emitted on the DATA RIGHT line DR, that is a positive going pulse appears on the DATA RIGHT line DR from receiver 50. This pulse is used to set flip-flop 55. The output of flip-flop 55 is fed into the DR "shift right input" on shift register 52. Next, the CLOCK line CP from receiver 50 has a positive-going pulse placed on it by computer 14. The leading edge of this clock pulse CP causes the data present at the DR "shift right input" to be gated into shift register 52 with all station interfaces 23 on the data transmission channel shifting right one position. The CLOCK signal CP is inverted in amplifier 54 and fed into the "clock" input of flip-flop 55. Flip-flop 55 responds to a positive going step in the clock input by setting its output to the value then prsent on the flip-flop's "data" line. In this application, the "data" line is grounded, and the positive going step into the "clock" line occurs on the trailing edge of the original CLOCK pulse CP out of receiver 50. The net effect of this arrangement is to set flip-flop 55 whenever a "1" is to be inputted into shift register 52 and to clear this same flip-flop on the trailing edge of each clock pulse CP. As a result, if computer 14 should be interrupted by a high priority task after the emission of a data pulse, flip-flop 55 will continue to hold the data until a CLOCK pulse CP can finally be emitted.

Computer 14 examines the bit stream to be outputted, and for each bit position emits or suppresses the emission of a data pulse, depending upon whether or not a "1" or a "0" respectively is to be emittted. After the bit stream examination for each bit position a clock pulse CP is emitted. This examination and clocking procedures cycles until all the bits associated with a given data transmission channel have been outputted. Then the positive going LATCH pulse L out of receiver 50 is produced by computer 14, thereby moving shift register 52 parallel output states into latch 70 for storage.

The transmission verify phase commences by changing the state of $\overline{S0}$ and $\overline{S1}$ lines to select the "shift left" mode DL and the data is verified exactly as described under the "Input Cycle" above.

MILL PRESET CYCLE OF OPERATION

In addition to the Output Cycle, mill presetting requires four phases of the Mill Preset Cycle of operation. These phases are: one, transistor driver 74 activation; two, first transistor driver 74 verify; three, transfer to D/A converter 27 or to preset relays, and four, second transistor driver 74 verify. The software for performing these functions is the PRESET routine described above.

To activate the transistor driver 74, phase one, computer 14 picks up the CPWK relay turning on the transistor driver 74 and simultaneously removing the thumbwheel 60 supply voltages. At this point, the voltage being presented to diodes 65 comes exclusively from the collectors of the transistors.

Before the "read" button 21 is activated by computer 14 in phase two, the "first transistor driver 74 verify" is performed. A reading of the data transmission channel is performed as described under the "Input Cycle". Following this, the desired output bit pattern is compared with the bit pattern that had just been read. Any errors encountered trigger a complete recycling of the output sequence as described in PRESET routine above.

After successfully completing phase two, the transfer to the D/A converter 27 or to preset relays, phase three is effected. In this phase, computer 14 automatically does the equivalent of pressing a remote "read" button. The timing is described under the PRESET routine.

After the computer-generated read button has been depressed and released, phase four, the second transistor driver 76 verify, is performed as described in phase two. Again, any encountered errors cause up to a specified number of retries before either succeeding or taking the computer "off-line".

ON-LINE DIAGNOSTICS OPERATION

Each time that an input-output operation is performed the entire transaction associated with the time division multiplexing is verified. As noted previously, any time that a disagreement is observed an error message is generated. Some error messages are legitimate in that they do not signify a true error condition. This can occur when for instance, a reading is made of the preset thumbwheel switches 60 at the same time an operator is making a change. In this case the switch pattern may be truly different on each of the two "reads" that constitute the input cycle.

If, however, a given data transmission channel begins to rather frequently exhibit a verify error (not an abort), it is possible to make a temporary core change through programmers' terminal 47 on channel "L" so that the error message referred to in SHIFT routine described above only appears to be an abort, thereby causing the station interface 23 bit number of the offending bit to be outputted. If the bit number causing the problem does not change from error to error, the problem lies in either the shift register 52 pointed to by the station interface 23 bit number via the input-output bit assignment, or in the lines leading to that specific input bit. This stationary verify error bit number is possible only on an input operation since during an output the data passes serially through the line transmitters and receivers so that if a given element is tending to go bad the corrupted bit number will be highly variable. In the case of the complete "death" of a station interface, a stationary pattern may also appear.

The abort messages from the SHIFT routine described above indicate the type of operation being performed (either input or output). This information is conveyed in the first digit of a "STATUS = xxxx ..." message on digital terminal 38. If the X'1000' bit is set, an input operation was being performed; if not set, an output operation was being performed. The data transmission system during an input operation uses only the "data left" pathway, whereas during an output operation both the "data right" and the "data left" path are used. Thus, knowledge of the type of input-output involved when an error occurs, even if the bit number changes, will enable one to determine which serial pathway may be troublesome.

I claim:
1. A digital data communications system comprising:
 (a) digital computer means having a serial access port, a data processing unit, a memory, and software-controlled means for producing and storing in said memory at least one bidirectional channel sequence of serial data signals representing data to be communicated, each channel sequence representing one or more station bit frames each having serial data bits but excluding protocol bits, said software-controlled means also producing a plurality of bidirectional data flow control signals based on software control logic for controlling movement of the serial data signals in and out of the computer memory by way of the serial access port;
 (b) at least one serial data transmission channel having separate lines for bidirectional communication of the serial data signals and the bidirectional data flow control signals between the computer means serial access port and one or more remote stations on each channel; and
 (c) separate series-to-parallel station interface means connected at each said one or more remote stations on each data transmission channel, each interface means circuited for: .1 receiving and transmitting the data flow control signals from the computer means to each interface means on a given channel based on the computer software control logic, .2 receiving and transmitting the sequence of serial data signals to and from the computer means and any remote station on a given channel in response to the data flow control signals, and .3 permitting parallel data communications of any one serial station bit frame of data signals between the interface means and one of two external parallel-data peripheral devices, or both, in response to the data flow control signals.

2. The system of claim 1 wherein the one or more remotely located station interface means, the computer memory, and the computer software control logic are adapted to cooperate to flow a channel sequence of serial data signals into the computer means from each parallel-data peripheral device during an input portion of a basic input operating cycle, then to verify bit conditions of the input data during a succeeding verify-input portion of the basic input operating cycle, the verification occurring in storage and comparison fields of the computer memory.

3. The system of claim 1 wherein the one or more remotely located station interface means, the computer memory and the computer software control logic are adapted to cooperate to flow a channel sequence of serial data signals from the computer means into each parallel-data peripheral device during an output portion of a basic output operating cycle, then to verify bit conditions of the output during a succeeding verify-output portion of the basic output operating cycle, the verification occurring in storage and comparison fields of the computer memory.

4. The system of claim 1 having basic input and output operating cycles, each cycle consisting essentially of respective input or output portions and input-verify or output-verify portions, and wherein the one or more remotely located station interface means, the computer memory and the computer software control logic are adapted to cooperate to flow a channel sequence of serial data signals first into the computer means from each parallel-data input peripheral device during data input operation, then to verify bit conditions of the input data during input operations, second flow the serial data signals out of the computer means into a parallel-data output peripheral device during data output operation, then to verify bit conditions of the output data during output-verify operation, the verifications occurring in respective storage and comparison fields of the computer memory.

5. The system of claim 4 wherein at least one station interface means that is associated with a respective peripheral device is adapted to include internal feedback circuitry from a parallel data output to a parallel data input to prevent loss of, or change in, parallel data bits in the station bit frame.

6. The system of claim 1 wherein at least one station bit frame is modified to include an interrupt bit, each station interface means is circuited to provide a true interrupt capability by generating an internal interrupt signal in response to an external action device associated with each station interface, the data transmission channel is adapted to include a separate interrupt line carrying interrupt signals to the computer means, and the computer means is adapted to be alerted by a true interrupt signal originating at a station interface means.

7. The system of claim 6 wherein each station interface means is further circuited to merge an external interrupt signal from a succeeding interface with the internal interrupt signal and transmit a combined interrupt signal over the same line to the computer means.

8. The system of claim 6 wherein means within the station interface means for converting serial data to parallel data having a station bit frame of "N" bits is circuited to commit one of the bits as an interrupt bit for the computer means use in identifying which station interface means on a data transmission channel originated the true interrupt request.

9. The system of claim 8 wherein the converting means is circuited to commit two or more bits of the station bit frame for interrupt identification purposes.

10. The system of claim 1 further comprising:
  (d) means connected through a station interface means on a data transmission channel and associated with the computer means for providing on-line diagnostic capabilities of other station interface means on any channel.

11. The system of claim 1 further comprising: means connected through a station interface means on a data transmission channel for programming the computer means.

12. In a digital process control system having a plurality of variable parameter actuators associated with preset devices, a digital data communications system comprising:
  (a) digital process control computer means having a serial access port, a data processing unit, a memory, and softwarecontrolled means for producing and storing in said memory at least one bidirectional channel sequence of serial data signals representing data to be communicated, one of the channels being a preset channel, each channel sequence representing one or more station bit frames, each frame having serial data bits but excluding protocol bits, said softwarecontrolled means also producing a plurality of bidirectional data flow control signals based on software control logic for controlling movement of the serial data signals in and out of the computer memory by way of the serial access port;
  (b) at least one serial data transmission channel, each of which is a preset channel, each channel having separate lines for bidirectional communication of the serial data signals and the bidirectional data flow control signals between the computer means serial access port and one or more remote stations on each channel; and
  (c) separate series-to-parallel station interface means connected at each said one or more remote stations on at least the preset data transmission channel, each interface means circuited for: 1. receiving and transmitting the data flow control signals from the computer means to each interface means on a given channel based on the computer software control logic, 2. receiving and transmitting the sequence of serial data signals to and from the computer means and any remote station on a given channel in response to the data flow control signals, and 3. permitting parallel data communications of any serial station bit frame of data signals between the interface means on one of two external parallel-data peripheral devices, or both, including preset devices on the preset channel, in response to the data flow control signals.

13. A serial-to-parallel station interface for use on a bidirectional data transmission channel in a digital data communication system having software-controlled means in computer means for generating a bidirectional channel sequence of serial data signals representing data to be communicated, each channel sequence representing one or more station bit frames each having serial data bits but excluding protocol bits, said software-controlled means also producing a plurality of bidirectional data flow control signals for controlling movement of the serial data signals in an out of said computer means, both said data signal and said control signal generation based on software control logic, said station interface comprising:
  (a) first means for: 1. receiving and transmitting the data flow control signals in parallel from the software controlled means to one station interface, or between two station interfaces, based on the software control logic, and 2. receiving and transmitting a sequence of serial data signals in series to and from the computer means and one station interface, or between two station interfaces, in response to the data flow control signals; and
  (b) second means for permitting parallel data communications of one serial station bit frame of data signals to and from the station interface and one of two external parallel-data peripheral devices, or both, in response to the data flow control signals.

14. The station interface of claim 13 wherein the first and second means are adapted to verify station frame bit conditions in one of two of the interface-associated peripheral devices, or both, in response to one or more predetermined combinations of the data flow control signals.

15. A serial-to-parallel station interface for use on a bidirectional data transmission channel in a digital data communication system having software-controlled means in computer means for generating a bidirectional channel sequence of serial data signals representing data to be communicated, each channel sequence representing one or more station bit frames each having serial data bits but excluding protocol bits, said software-controlled means also producing a plurality of bidirectional data flow control signals for controlling movement of the serial data signals in and out of said computer means, both said data signal and said control signal generation based on software control logic, said station interface comprising:

(a) serial input means and serial output means for receiving and transmitting one station bit frame of serial data signals and the data flow control signals bidirectionally over an external data transmission channel based on the software control logic;

(b) parallel input means and parallel output means for permitting parallel data communications of one station bit frame of serial data signals to and from the interface and one or two external peripheral devices, or both in response to the data flow control signals; and (c) multifunctional shift register means circuited to interconnect the serial input means with serial output means and the parallel input means with parallel output means, said shift register means adapted to shift the station bit frame of serial data signals bidirectionally and effect parallel loading or do nothing to interconnect the parallel inputs and outputs, in response to a predetermined plurality of the data flow control signals.

16. The interface of claim 15 further comprising: feedback circuit means interconnecting the parallel output means with the parallel input means for enabling verification of the station frame bit condition in the shift register means in response to a predetermined plurality of the data flow control signals.

17. The station interface of claim 15 wherein the station bit frame has both data bits and at least one interrupt bit and further comprising:

interrupt circuit means for providing a true interrupt capability by generating an internal interrupt signal in response to manual or automatic initiation of an external action device associated with each station interface, the internal interrupt signal being carried on data transmission circuitry between the serial input means and serial output means for alerting the computer means of an interrupt condition.

18. The station interface of claim 17 further circuited to merge an external interrupt signal received through the serial output from a succeeding interface with the internal interrupt signal and transmit a combined interrupt signal through the serial input for use externally by the computer.

19. The station interface of claim 17 wherein the shift register means accommodates a station bit frame of "N" bits and is circuited to commit one of the bits as an interrupt bit for the computer to use in identifying which station interface on a data transmission channel originated the true interrupt request.

20. The station interface of claim 19 wherein the shift register means is circuited to commit two or more bits of the station bit frame for interrupt identification purposes.

* * * * *